(12) United States Patent
Kuboki et al.

(10) Patent No.: US 10,181,592 B2
(45) Date of Patent: Jan. 15, 2019

(54) ELECTRICITY STORAGE MODULE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Hideyuki Kuboki, Yokkaichi (JP); Hiroki Hirai, Yokkaichi (JP); Tomoyuki Sakata, Yokkaichi (JP); Makoto Higashikozono, Yokkaichi (JP); Toshifumi Ichio, Yokkaichi (JP); Kenji Nakagawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 173 days.

(21) Appl. No.: 15/304,745

(22) PCT Filed: Apr. 28, 2015

(86) PCT No.: PCT/JP2015/062786
§ 371 (c)(1),
(2) Date: Oct. 17, 2016

(87) PCT Pub. No.: WO2015/170642
PCT Pub. Date: Nov. 12, 2015

(65) Prior Publication Data
US 2017/0040583 A1    Feb. 9, 2017

(30) Foreign Application Priority Data
May 7, 2014  (JP) ................................. 2014-095693

(51) Int. Cl.
H01M 2/10 (2006.01)
H01M 2/30 (2006.01)
(Continued)

(52) U.S. Cl.
CPC ............ *H01M 2/1061* (2013.01); *H01G 2/04* (2013.01); *H01G 9/0003* (2013.01); *H01G 9/008* (2013.01);
(Continued)

(58) Field of Classification Search
CPC .... H01M 2/1061; H01M 2/202; H01M 2/204; H01M 10/482; H01M 2/1077; H01M 2/206; H01M 2/30
See application file for complete search history.

(56) References Cited

U.S. PATENT DOCUMENTS

2007/0207377 A1  9/2007  Han et al.
2010/0055993 A1  3/2010  Ikeda et al.
(Continued)

FOREIGN PATENT DOCUMENTS

EP    3 104 467 A1   12/2016
JP    2010-055885 A   3/2010
(Continued)

OTHER PUBLICATIONS

Aug. 11, 2015 Search Report issued in International Patent Application No. PCT/JP2015/062786.
(Continued)

*Primary Examiner* — Stewart A Fraser
(74) *Attorney, Agent, or Firm* — Oliff PLC

(57) ABSTRACT

An electricity storage module includes a power storage element group obtained by stacking a plurality of power storage elements each having a lead terminal, a connection member that is electrically connected to the lead terminal, a connector for electrically connecting the connection mem-
(Continued)

ber to an external device, and a terminal member for electrically connecting the connection member to the connector. The connection member has a connection portion that is disposed in parallel with a direction in which the power storage elements are stacked, and that is connected to the terminal member, and the terminal member is connected to the connection portion in a state in which the terminal member is movable in the direction in which the power storage elements are stacked.

4 Claims, 28 Drawing Sheets

(51) Int. Cl.
| | |
|---|---|
| H01M 2/20 | (2006.01) |
| H01G 11/12 | (2013.01) |
| H01G 11/76 | (2013.01) |
| H01G 2/04 | (2006.01) |
| H01M 2/34 | (2006.01) |
| H01G 11/16 | (2013.01) |
| H01G 9/00 | (2006.01) |
| H01G 9/008 | (2006.01) |
| H01G 9/08 | (2006.01) |
| H01M 10/48 | (2006.01) |
| H01M 10/625 | (2014.01) |
| H01M 10/647 | (2014.01) |
| H01M 10/6555 | (2014.01) |
| H01M 10/613 | (2014.01) |

(52) U.S. Cl.
CPC ............... *H01G 9/08* (2013.01); *H01G 11/12* (2013.01); *H01G 11/16* (2013.01); *H01G 11/76* (2013.01); *H01M 2/10* (2013.01); *H01M 2/1077* (2013.01); *H01M 2/20* (2013.01); *H01M 2/202* (2013.01); *H01M 2/204* (2013.01); *H01M 2/206* (2013.01); *H01M 2/30* (2013.01); *H01M 2/34* (2013.01); *H01M 2/348* (2013.01); *H01M 10/482* (2013.01); *H01M 10/48* (2013.01); *H01M 10/613* (2015.04); *H01M 10/625* (2015.04); *H01M 10/647* (2015.04); *H01M 10/6555* (2015.04); *H01M 2200/103* (2013.01); *Y02E 60/13* (2013.01); *Y02T 10/7022* (2013.01)

(56) References Cited

U.S. PATENT DOCUMENTS

| | | | |
|---|---|---|---|
| 2011/0045329 A1 | 2/2011 | Ikeda et al. | |
| 2011/0248719 A1* | 10/2011 | Aoki | H01M 10/482 |
| | | | 324/426 |
| 2013/0236805 A1 | 9/2013 | Furuya et al. | |
| 2013/0288530 A1 | 10/2013 | Zhao | |
| 2014/0322978 A1 | 10/2014 | Okamoto et al. | |
| 2017/0062881 A1* | 3/2017 | Kuboki | H01G 11/12 |

FOREIGN PATENT DOCUMENTS

| | | |
|---|---|---|
| JP | 2011-040335 A | 2/2011 |
| JP | 2011-091003 A | 5/2011 |
| JP | 2013-114956 A | 6/2013 |
| WO | 2005/060025 A1 | 6/2005 |
| WO | 2011/040297 A1 | 4/2011 |

OTHER PUBLICATIONS

Jul. 5, 2017 Search Report issued in European Patent Application No. 15789377.7.

* cited by examiner

ELECTRICITY STORAGE MODULE

TECHNICAL FIELD

The present disclosure relates to an electricity storage module.

BACKGROUND ART

In general, battery modules mounted on electric cars or hybrid vehicles, for example, are constituted by connecting multiple electric cells in series or in parallel with each other via bus bars.

Such a battery module includes a terminal for detecting a state of an electric cell group (voltage, temperature, or the like) and an electric wire for connecting the terminal and a controller for an ECU or the like (see Patent Document 1, for example).

CITATION LIST

Patent Documents

Patent Document 1: JP 2011-91003A

SUMMARY

Technical Problem

In Patent Document 1 above, a voltage detection terminal to which a voltage detection electric wire is crimped is bolted to the electrode together with the bus bar for connecting the electric cells, and accordingly, the voltage detection terminal can be electrically connected to the controller for controlling the electric cell group and the battery, such as an ECU.

Incidentally, as a method for connecting a detection terminal for detecting a state of an electric cell to an external device for controlling the battery, such as the controller, there is the method of using a connector instead of bolting.

Here, in the battery module including the electric cell group obtained by stacking a plurality of electric cells, if the detection terminal and the external device are connected to each other using a connector, the position at which the connector and the detection terminal are connected to each other shifts due to tolerances in the direction in which the electric cells are stacked. Therefore, it has been necessary to use a connector having a structure that gives consideration to tolerances in the direction in which the electric cells are stacked.

An object of the present disclosure is to provide an electricity storage module that can accommodate tolerances in the direction in which the power storage elements are stacked, even with a simple configuration.

Solution to Problem

An aspect of the present disclosure is an electricity storage module including a power storage element group obtained by stacking a plurality of power storage elements each having a lead terminal, a connection member that is electrically connected to the lead terminal, a connector for electrically connecting the connection member to an external device, and a terminal member for electrically connecting the connection member to the connector, the connection member having a connection portion that is disposed in parallel with a direction in which the power storage elements are stacked, and that is connected to the terminal member, and the terminal member being connected to the connection portion in a state in which the terminal member is movable in the direction in which the power storage elements are stacked.

In the present embodiment, the connection member has a connection portion that is disposed in parallel with a direction in which the power storage elements are stacked, and that is connected to the terminal member, and the terminal member is connected to the connection portion in a state in which the terminal member is movable in the direction in which the power storage elements are stacked. Therefore, tolerances in the direction in which the power storage elements are stacked can be accommodated due to the terminal member moving in the direction in which the power storage elements are stacked. As a result, according to the present embodiment, tolerances in the direction in which the power storage elements are stacked can be accommodated only with a configuration in which the connection portion of the connection member is disposed in parallel with the direction in which the power storage elements are stacked and a configuration in which the terminal member is connected to the connection member (the connection portion) movable in the stacking direction, and thus, tolerances in the direction in which the power storage elements are stacked can be accommodated even with a simple configuration.

The present embodiment may have the following configurations.

The connector may include a housing for holding the terminal member in a state in which the terminal member is electrically connected to the connection member while the terminal member is allowed to move in the direction in which the power storage elements are stacked.

If the terminal member that is allowed to move in the direction in which the power storage elements are stacked passes a position at which the terminal member is connected to the connection member, there is a concern that a state of electrical connection with the connection member will deteriorate. However, with the above-described configuration, the terminal member is held in a state in which the terminal member is electrically connected to the connection member while the terminal member is allowed to move in the direction in which the power storage elements are stacked, and thus, it is possible to ensure the state in which the terminal member and the connection member are electrically connected to each other.

The connector may be provided with a fuse mounting portion for mounting a fuse that is to be electrically connected to the lead terminal.

Such a configuration makes it possible to dispose the fuse near the power storage element, and thus overcurrent is unlikely to affect the other power storage elements.

Advantageous Effects

According to the present disclosure, it is possible to provide an electricity storage module that can accommodate tolerances in the direction in which the power storage elements are stacked, even with a simple structure.

DESCRIPTION OF EMBODIMENTS

Embodiment 1

Figure 1:
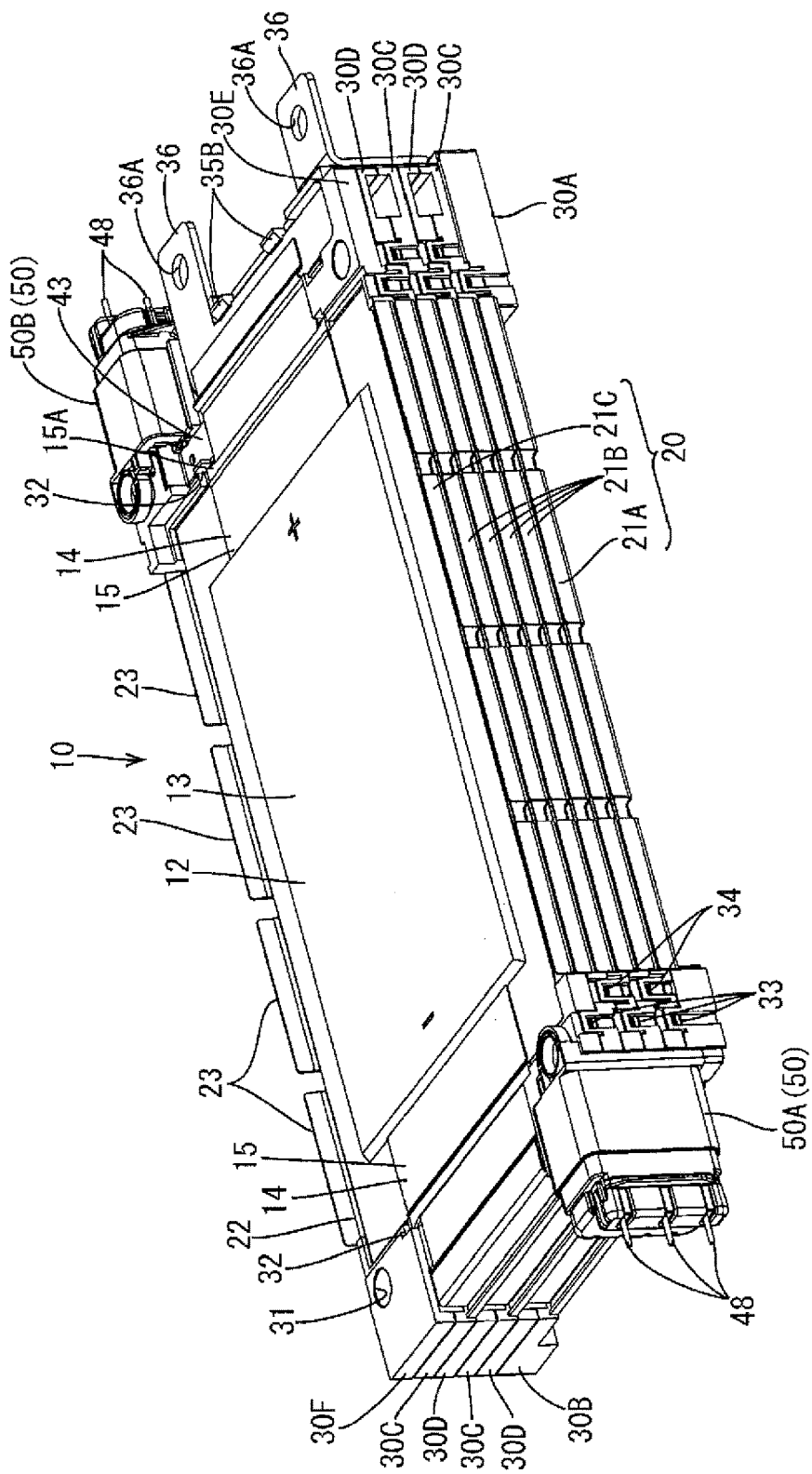
FIG. 1 is a perspective view of an electricity storage module of Embodiment 1 shown from the left side.

Embodiment 1 will be described with reference to FIGS. 1 to 28. In the drawings, reference signs may be given to only one member of a plurality of the same members, and reference signs may be omitted from the other same members. In the following description, the terms front and back respectively refer to the left side and right side of FIG. 1.

Figure 2:
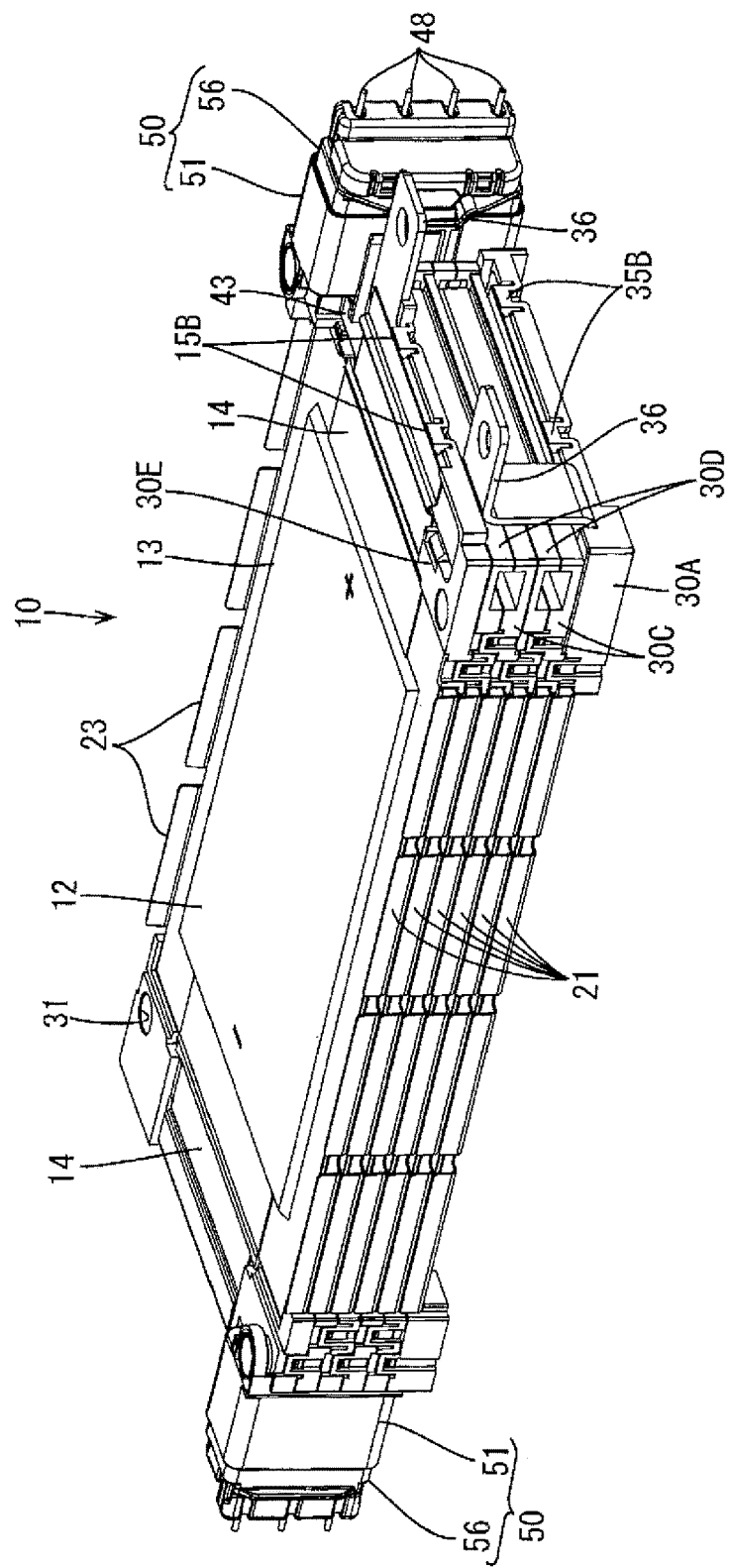
FIG. 2 is a perspective view of the electricity storage module viewed from the right side.

As shown in FIGS. 1 and 2, an electricity storage module 10 of the present embodiment includes a power storage element group 11 obtained by stacking a plurality of power storage elements 12 (six in the present embodiment). In the present embodiment, any power storage elements 12 such as secondary batteries, capacitors, and condensers can be used as the power storage elements 12 as needed. A secondary battery is used as the power storage element 12 according to the present embodiment.

The electricity storage module 10 of the present embodiment includes a stacked object 20 obtained by stacking six power storage units 21 each obtained by placing the power storage element 12 on a heat transfer member 22 to which a holding member 30 is attached.

Power Storage Unit 21

In the power storage units that constitute the stacked object 20, the power storage unit that is disposed at the lowermost stage is denoted as a first power storage unit 21A, the power storage units that are disposed at a second stage to a fifth stage from the bottom are denoted as second power storage units 21B, the power storage unit that is disposed at the uppermost stage is denoted as a third power storage unit 21C. Each of the power storage units 21 includes a heat transfer member 22 to which the holding members 30 are attached to both ends in its longitudinal direction, and a power storage element 12 that is placed on the heat transfer member 22 and held by the holding member 30.

Heat Transfer Member 22

The heat transfer member 22 is a member made of a heat conductive material. In the present embodiment, aluminum or an aluminum alloy, which has excellent heat conductivity, is used as the heat conductive material. As shown in FIG. 1, four heat conductive walls 23 that each arise upward are formed spaced apart from each other at a pair of side edges extending in the longitudinal direction of the heat transfer member 22. These heat conductive walls 23 are disposed in contact with an inner wall surface of a case when the stacked object 20 is accommodated in the case (not shown), and has a function of transmitting heat generated from the power storage elements 12 to the case. The heat that is generated from the power storage elements 12 travels to the case via the heat conductive walls 23, and is radiated to the outside of the case.

The holding members 30 made of an insulating resin material are attached to both ends in the longitudinal direction of the heat transfer member 22, and the power storage element 12 is placed on the upper surface of the heat transfer member 22.

Power Storage Element 12

Figure 3:
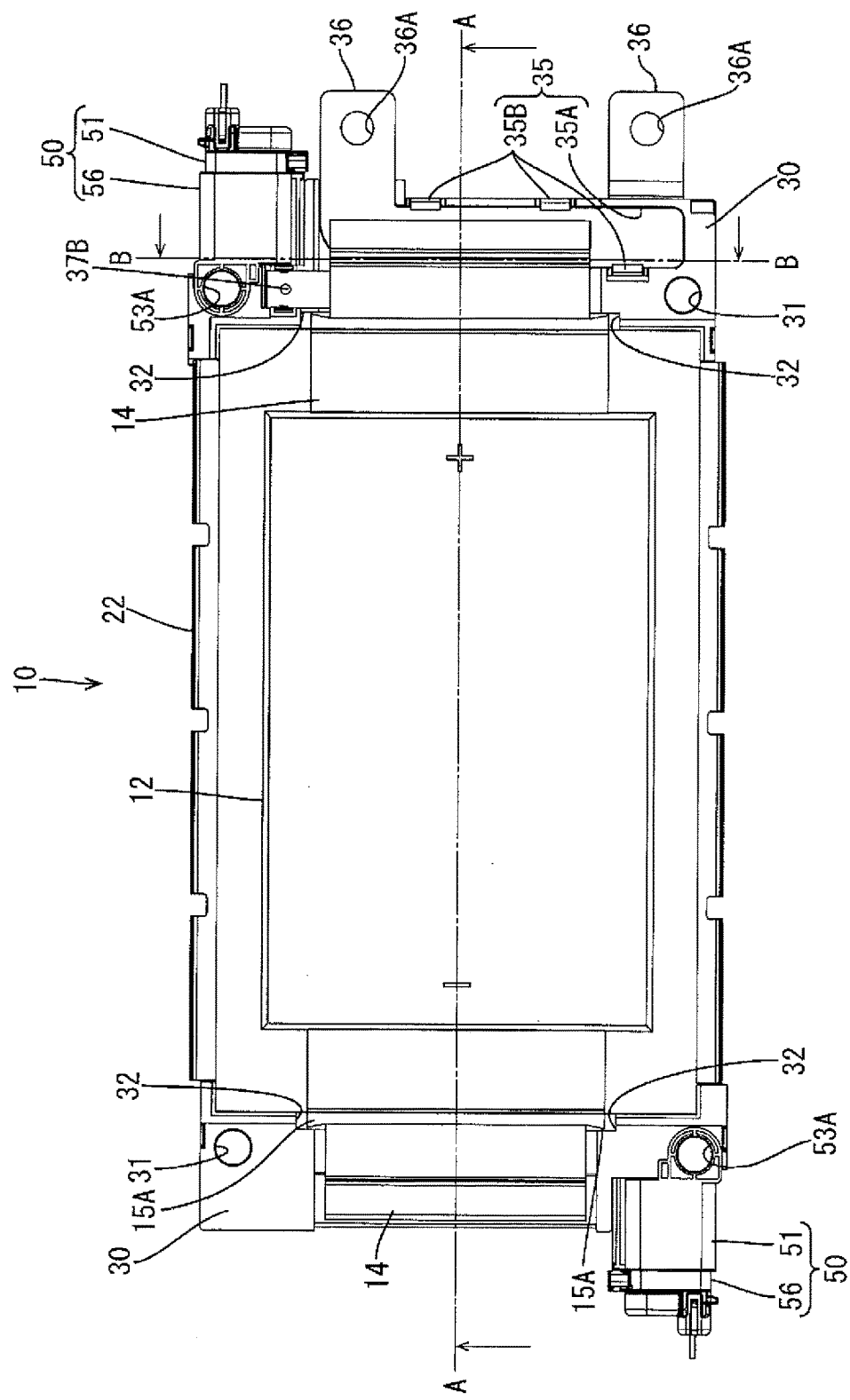
FIG. 3 is a plan view of the electricity storage module.

As shown in FIG. 3, the power storage element 12 has an approximately rectangular shape when viewed from the above. The power storage element 12 includes a container 13 obtained by welding side edges of a pair of laminate films each having an substantially rectangular shape, a power storage element (not shown) that is accommodated inside the container 13, and the lead terminals 14 that are connected to the power storage element inside the container 13 and drawn from the side edges of the container 13 to the outside. The polarity of the lead terminal 14 that is drawn from the edge on one side (side edge) of the container 13 is different from the polarity of the lead terminal 14 that is drawn from the edge on the other side.

Figure 4:
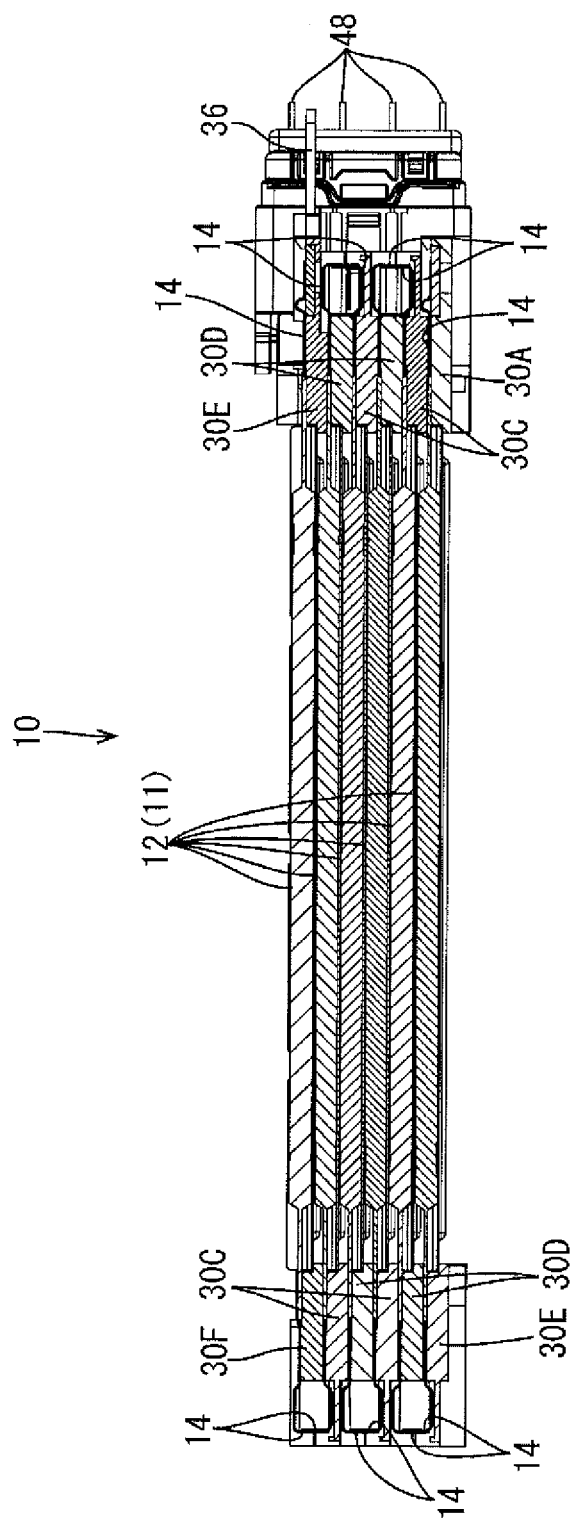
FIG. 4 is a cross-sectional view taken along line A-A in FIG. 3.
Figure 5:
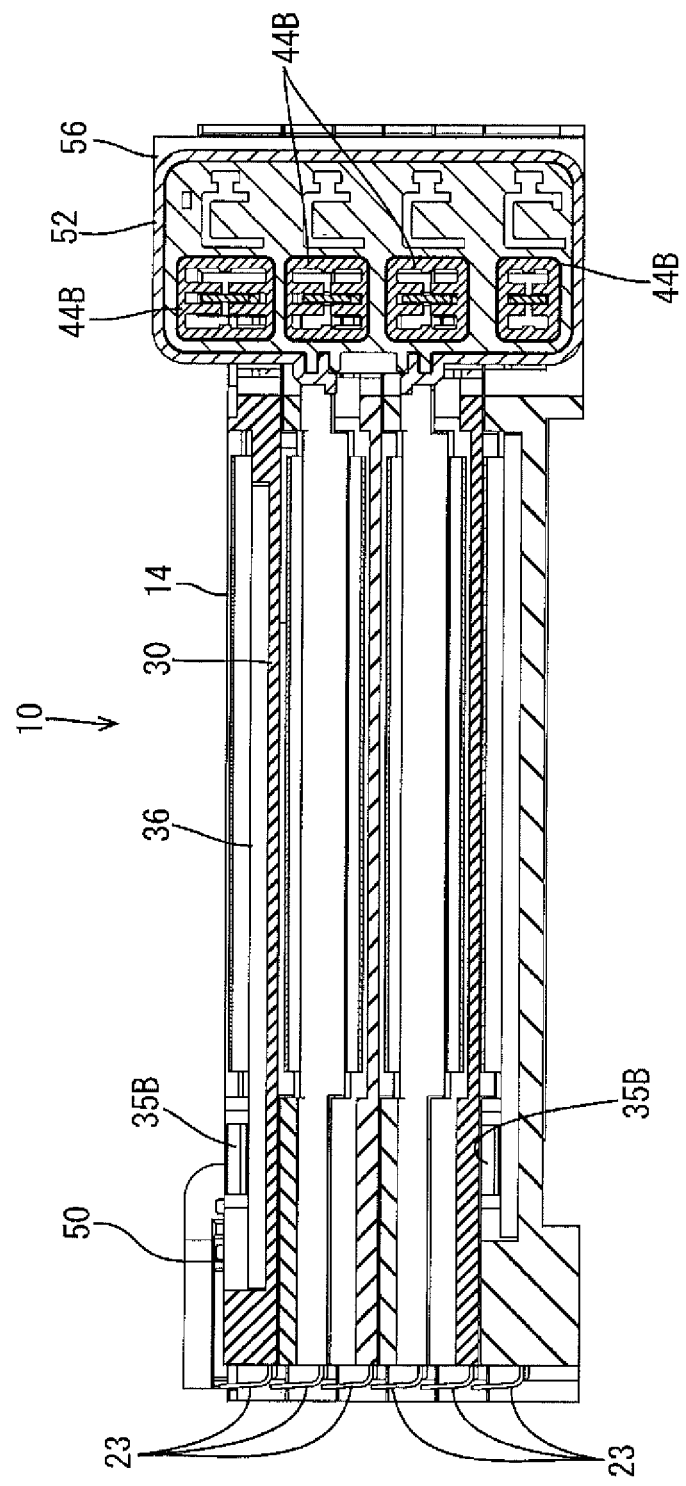
FIG. 5 is a cross-sectional view taken along line B-B in FIG. 3.
Figure 6:
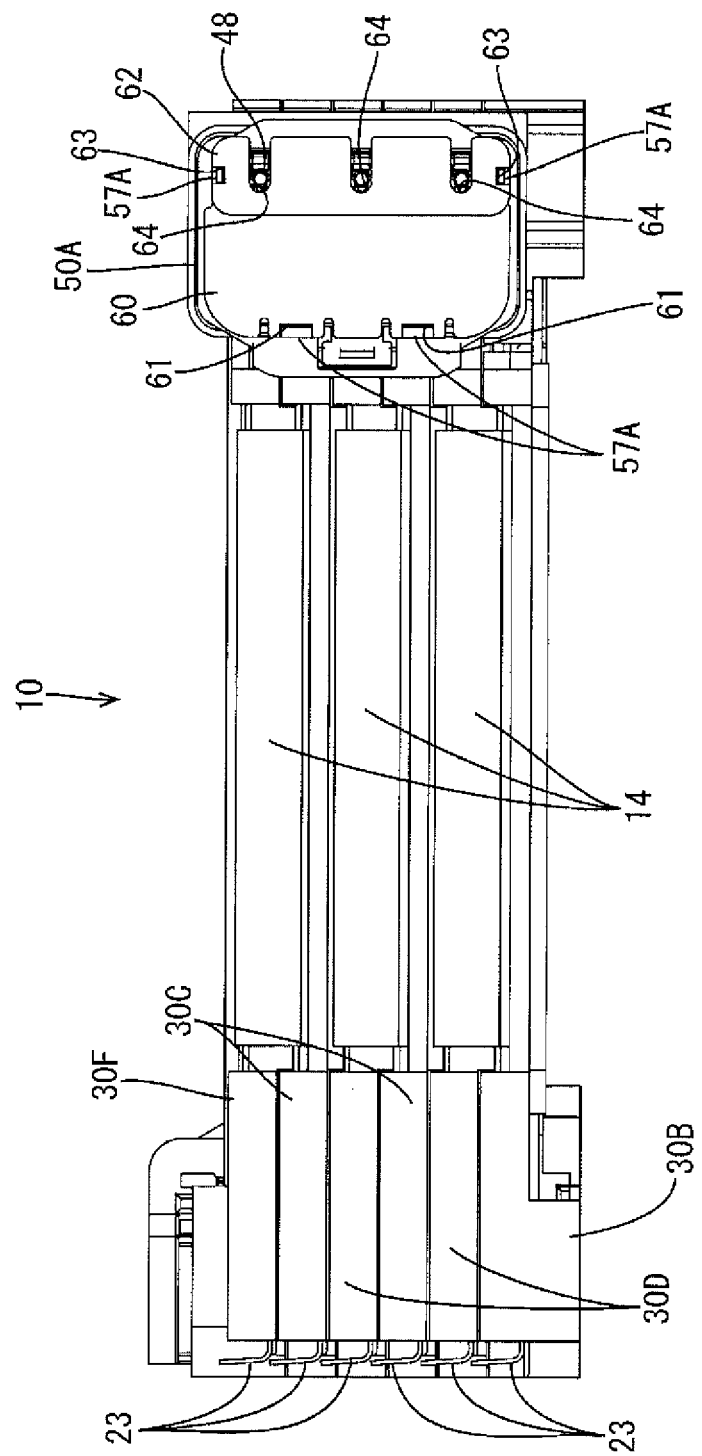
FIG. 6 is a left-side view of the electricity storage module.
Figure 7:
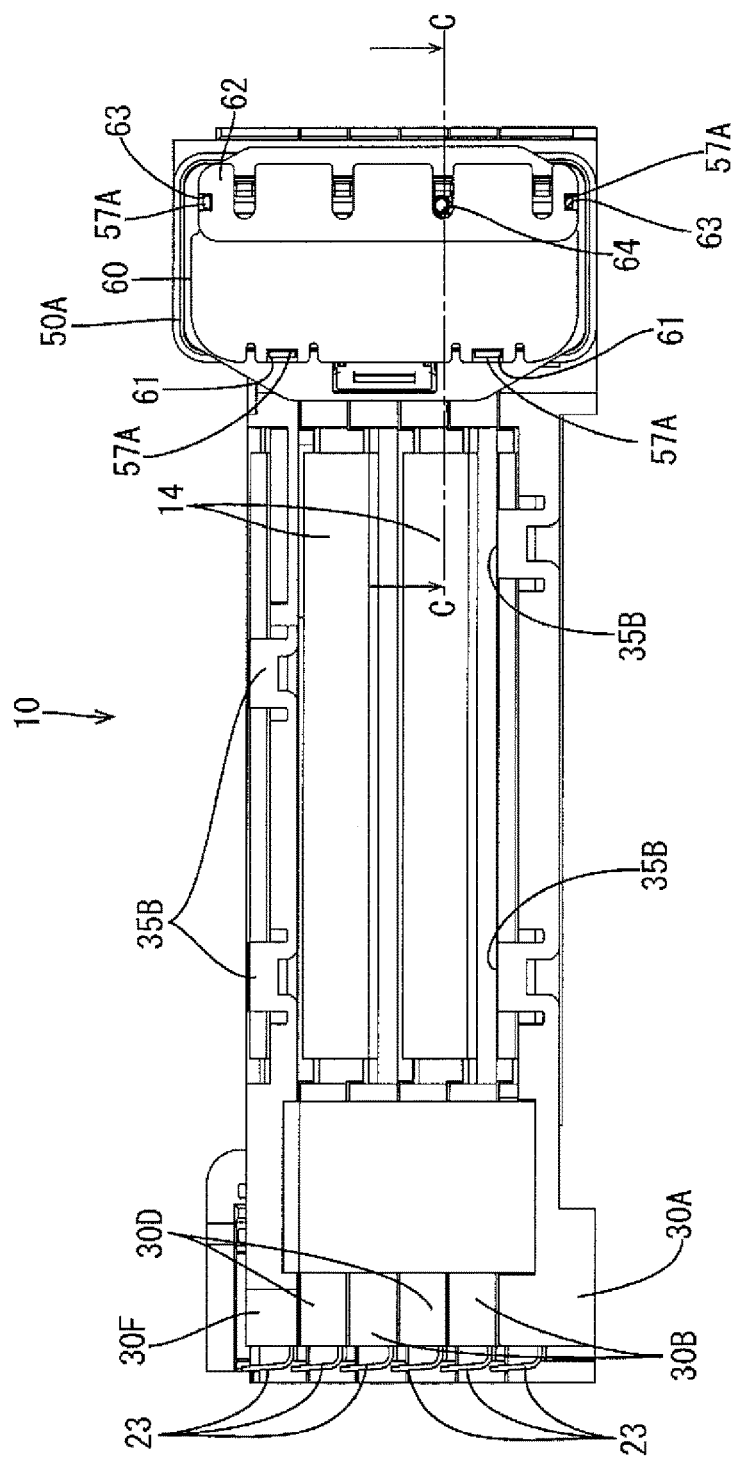
FIG. 7 is a right-side view of the electricity storage module.

As shown in FIG. 4, the power storage elements 12 that are placed on each other in the stacking direction are connected in series or in parallel with each other by disposing the lead terminals 14 of the power storage elements 12 over one another.

As shown in FIG. 4, in the present embodiment, the ends of the lead terminals 14 that are adjacent to each other in the stacking direction (the vertical direction in FIG. 4) are bent perpendicularly upward or perpendicularly downward, and are laid over each other.

The power storage elements 12 that are overlaid in the stacking direction are connected in series by electrically connecting the lead terminals 14 having opposite polarities. The lead terminals 14 that are adjacent to each other in the stacking direction can be connected by a known method such as welding, soldering, or brazing.

A metallic voltage detection bus bar 43 (an example of a connection member) for detecting voltage of the power storage element 12 is connected to the lead terminal 14 with a known method such as welding, soldering, or brazing.
Holding Member 30

As shown in FIGS. 17 to 22, the holding member 30 made of the insulating material is provided with two through holes 31 into which fixing members (not shown) are insertable. As shown in FIG. 3, a power storage element holding portion 32 is formed in each holding member 30, the power storage element holding portion 32 having a recessed shape into which a corner 15A of a wider region 15 of the lead terminal 14 is fitted. Movement of the lead terminal 14 (the power storage element 12) is restricted by this power storage element holding unit 32.

In the present embodiment, six types of holding members 30 are used. A rearward one of the two holding members 30 that are part of the first power storage unit 21A at the lowermost stage is a first holding member 30A (see FIG. 17), and a frontward one of those two holding members 30 is a second holding member 30B (see FIG. 18).

Figure 19:
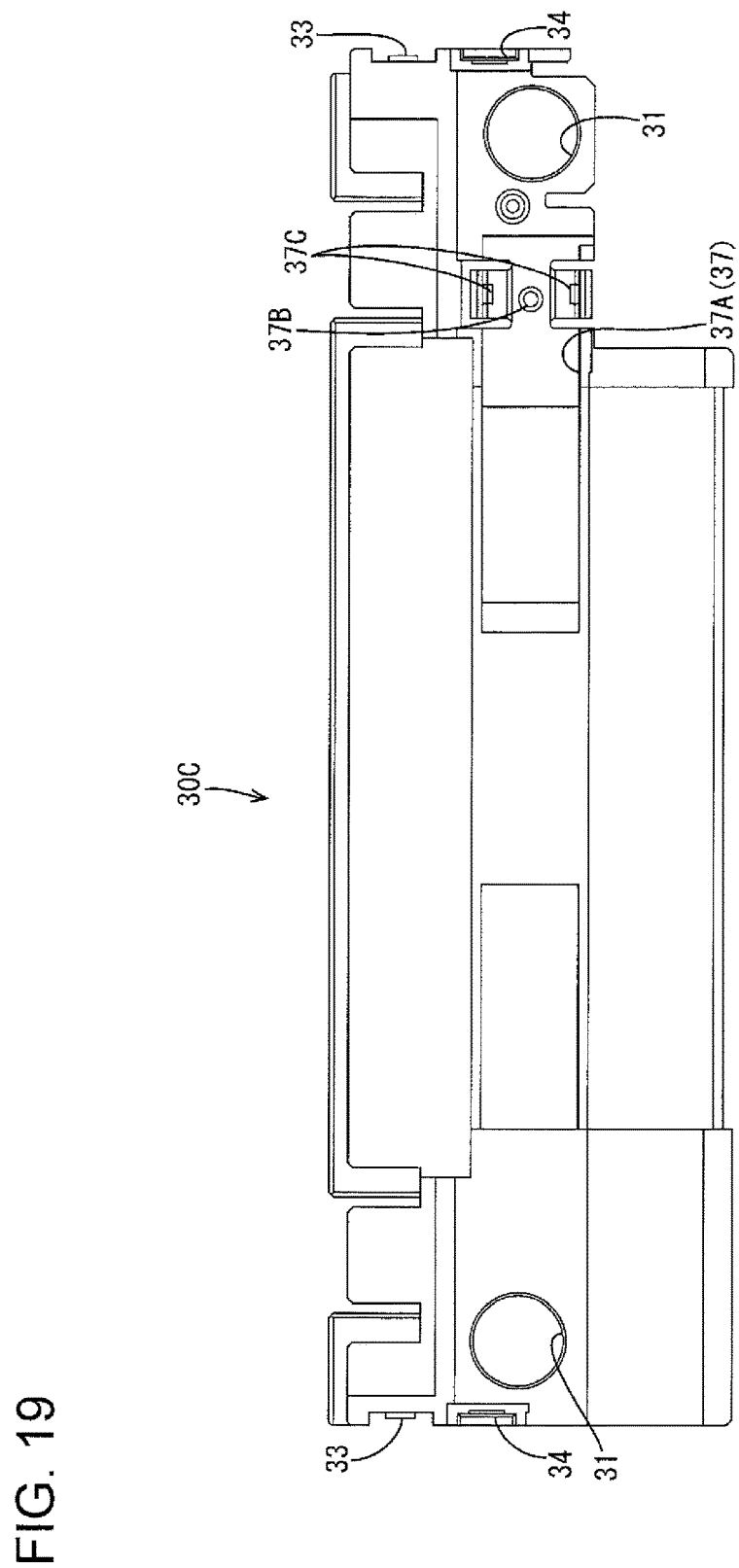
FIG. 19 is a plan view of a third holding member.
Figure 20:
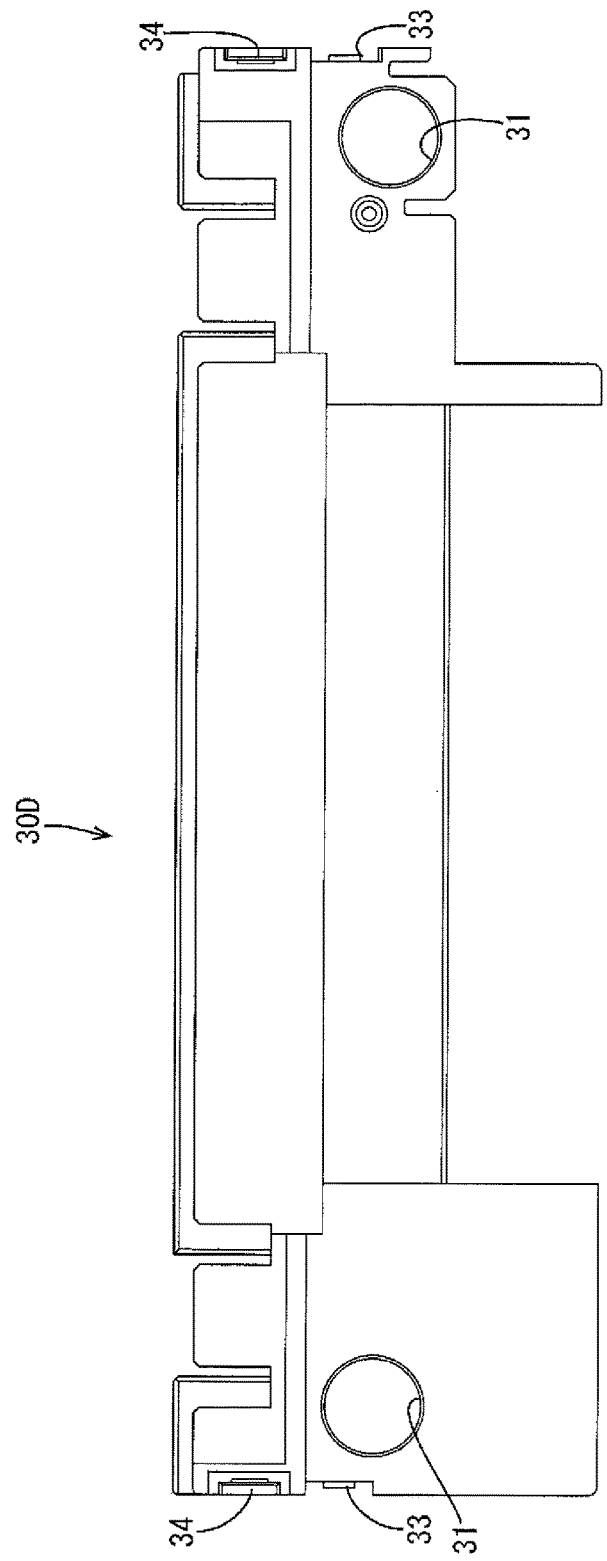
FIG. 20 is a plan view of a fourth holding member.

One of the two holding members 30 that are part of the second power storage units 21B at the second to fifth stages from the bottom is a third holding member 30C (see FIG. 19), and the other of those two holding members 30 is a fourth holding member 30D (see FIG. 20). The third holding member 30C is disposed rearward, and the fourth holding member 30D is disposed frontward at the second and fourth stages. The third holding member 30C is disposed frontward, and the fourth holding member 30D is disposed rearward at the third and fifth stages.

Figure 21:
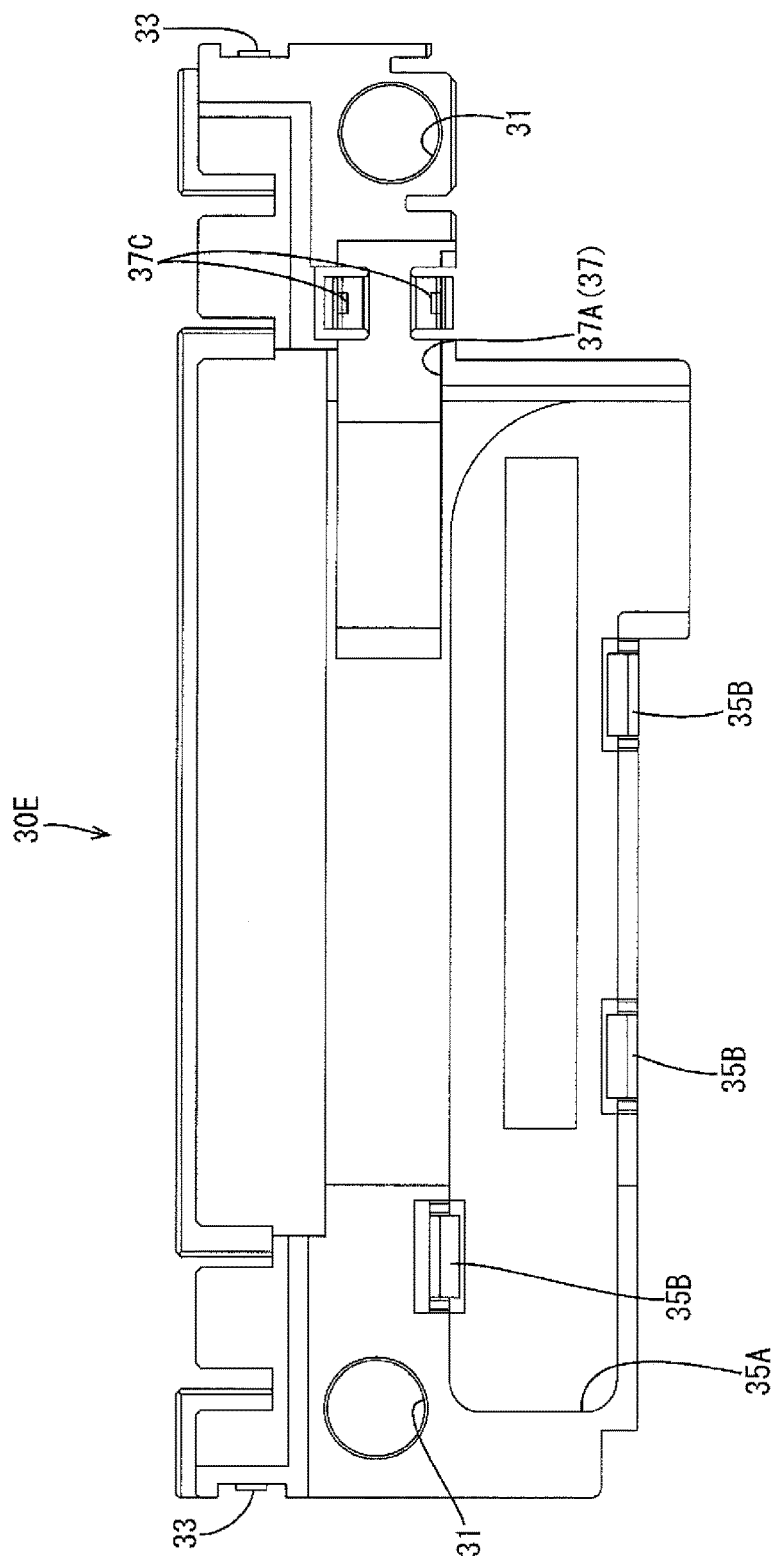
FIG. 21 is a plan view of a fifth holding member.
Figure 22:
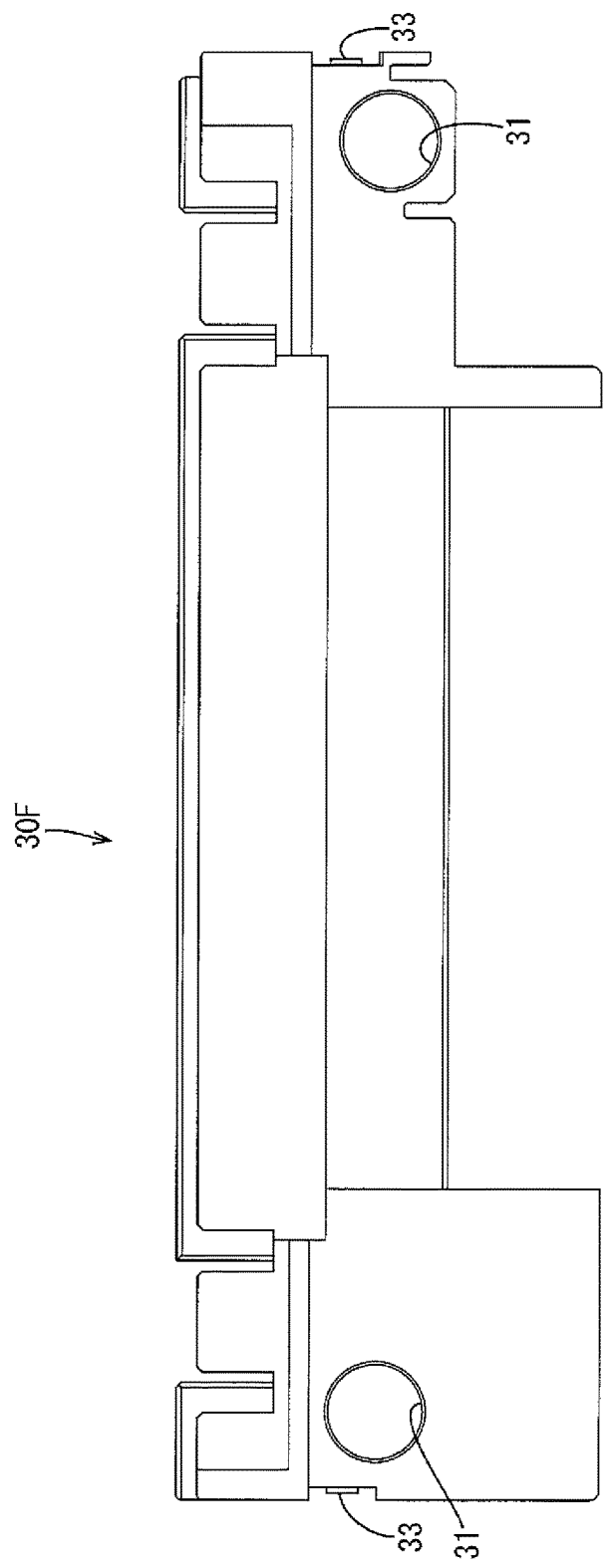
FIG. 22 is a plan view of a sixth holding member.

A rearward one of the two holding members 30 that are part of the third power storage unit 21C at the uppermost stage is a fifth holding member 30E (see FIG. 21), and a frontward one of those holding members 30 is a sixth holding member 30F (see FIG. 22).

In the present embodiment, the holding members 30 that are adjacent in the direction in which the power storage elements 12 are stacked are locked movably in the direction in which the power storage elements 12 are stacked (see FIGS. 25 to 28).

Figure 17:
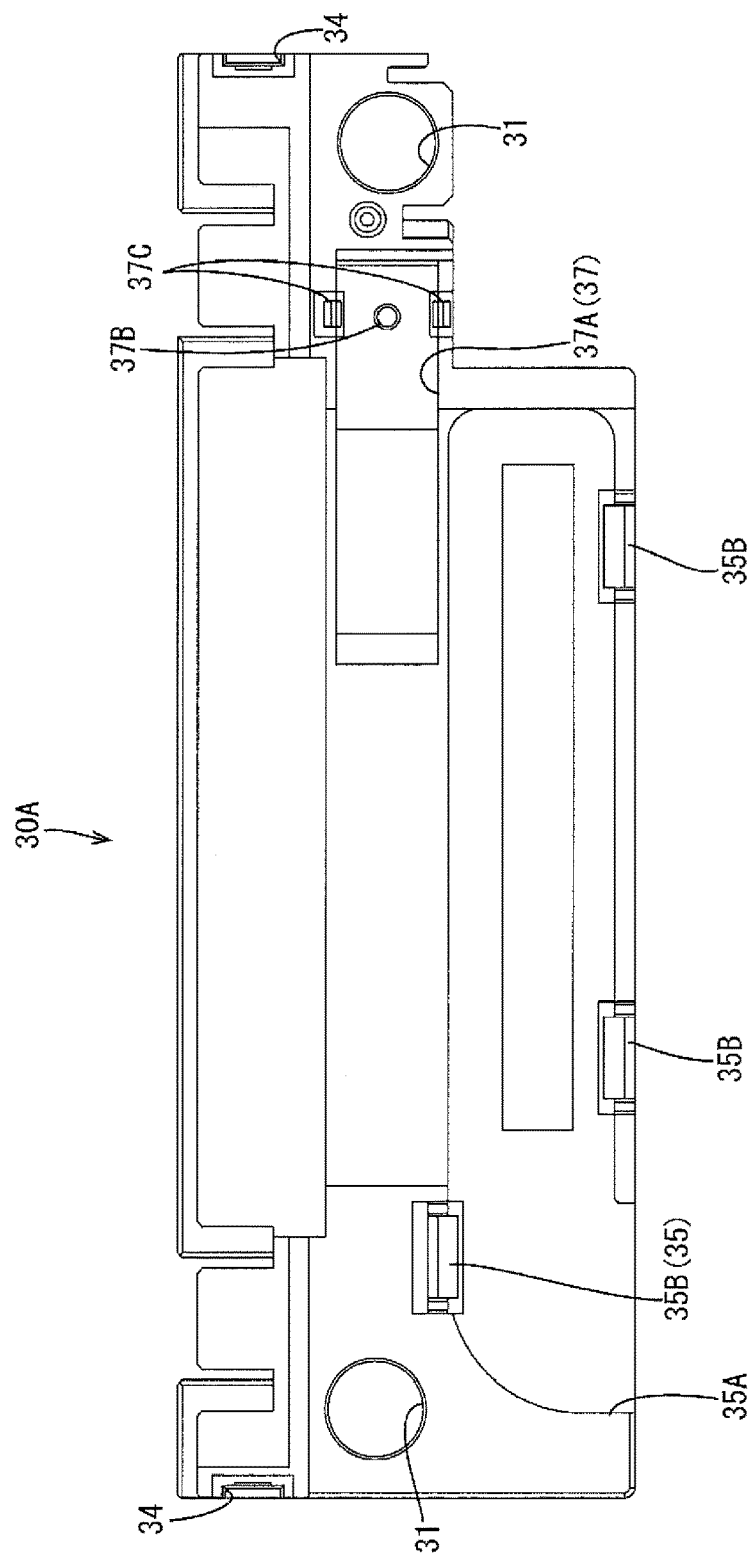
FIG. 17 is a plan view of a first holding member.
Figure 18:
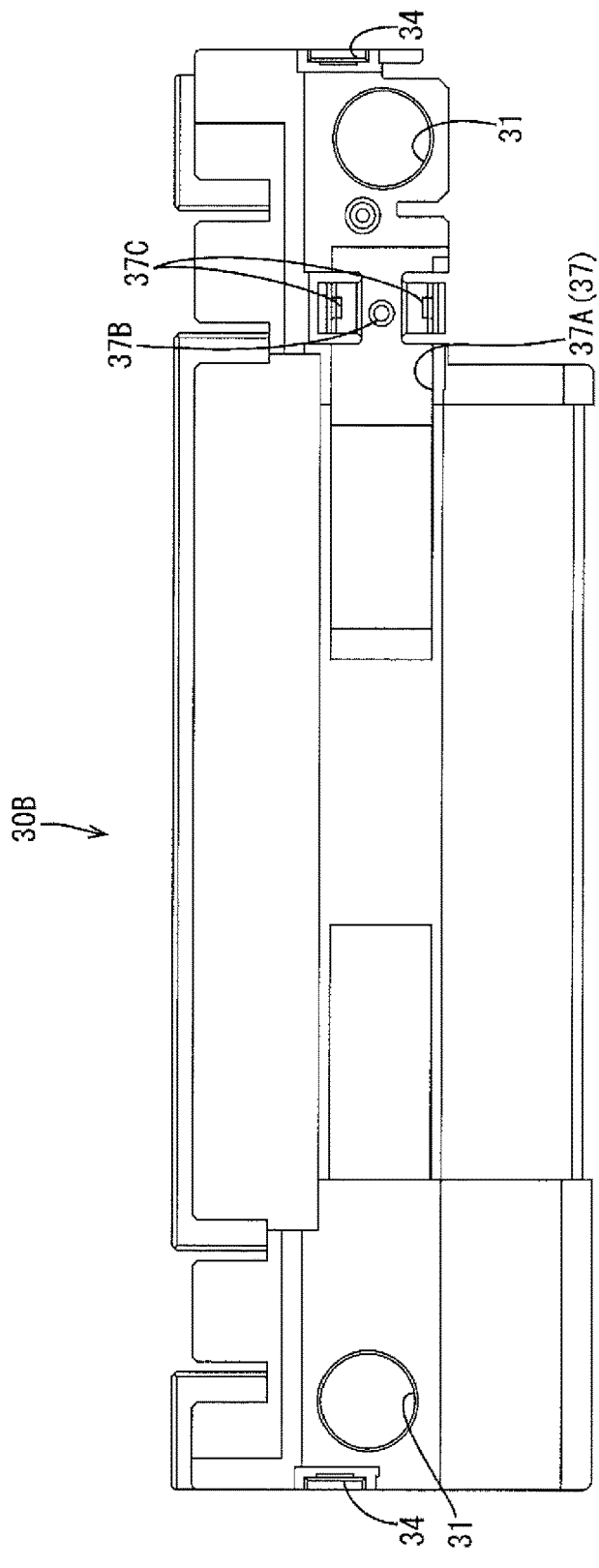
FIG. 18 is a plan view of a second holding member.

Locking reception portions 34 for receiving locking portions 33 of the third holding member 30C that is disposed above when stacked protrude from left and right edges of the first holding member 30A in FIG. 17. The locking reception portions 34 for receiving the locking portions 33 of the fourth holding member 30D that is disposed above when stacked protrude from left and right edges of the second holding member 30B in FIG. 18.

The locking portions 33 for being received by the locking reception portions 34 of the holding member 30 that is disposed below when stacked protrude from the left and right edges of the third holding member 30C in FIG. 19, and the locking reception portions 34 for receiving the locking portions 33 of the holding member 30 that is disposed above when stacked are formed at the left and right edges of the third holding member 30C in FIG. 19.

The locking portions 33 for being received by the locking reception portions 34 of the holding member 30 that is disposed below when stacked protrude from the left and right edges of the fourth holding member 30D in FIG. 20, and the locking reception portions 34 for receiving the locking portions 33 of the holding member 30 that is disposed above when stacked are formed at the left and right edges of the fourth holding member 30D in FIG. 20.

The locking portions 33 for being received by the locking reception portions 34 of the holding member 30 that is disposed below when stacked are formed at the left and right edges of the fifth holding member 30E in FIG. 21.

The locking portions 33 for being received by the locking reception portions 34 of the holding member 30 that is disposed below when stacked are formed at the left and right edges of the sixth holding member 30F in FIG. 22.

The bus bar holding portions 35 for holding an external connection bus bar 36 that is to be connected to an external device (not shown) are provided in the first holding member 30A and the fifth holding member 30E. The bus bar holding portion 35 includes a recess 35A into which the external connection bus bar 36 is fitted, and a retaining protrusion 35B for retaining the external connection bus bar 36 that has been fitted to the recess 35A.

The external connection bus bar 36 is made of a metal material such as copper, a copper alloy, aluminum, or an aluminum alloy, and is overlaid on the lead terminal 14. An end of the external connection bus bar 36 protrudes frontward, and the end is provided with a connection hole 36A that is to be connected to an external connection terminal (not shown).

The first holding member 30A, the second holding member 30B, the third holding member 30C, and the fifth holding member 30E are respectively provided with detection terminal holding portions 37 for holding the voltage detection bus bars 43.

The detection terminal holding portion 37 is provided with the recess 37A into which the terminal connection portion 43A of the voltage detection bus bar 43 is fitted, as well as an attachment pin 37B for attaching the terminal connection portion 43A and a pair of retaining pieces 37C for retaining the terminal connection portion 43A protruding therefrom.

Voltage Detection Bus Bar 43

Figure 15:
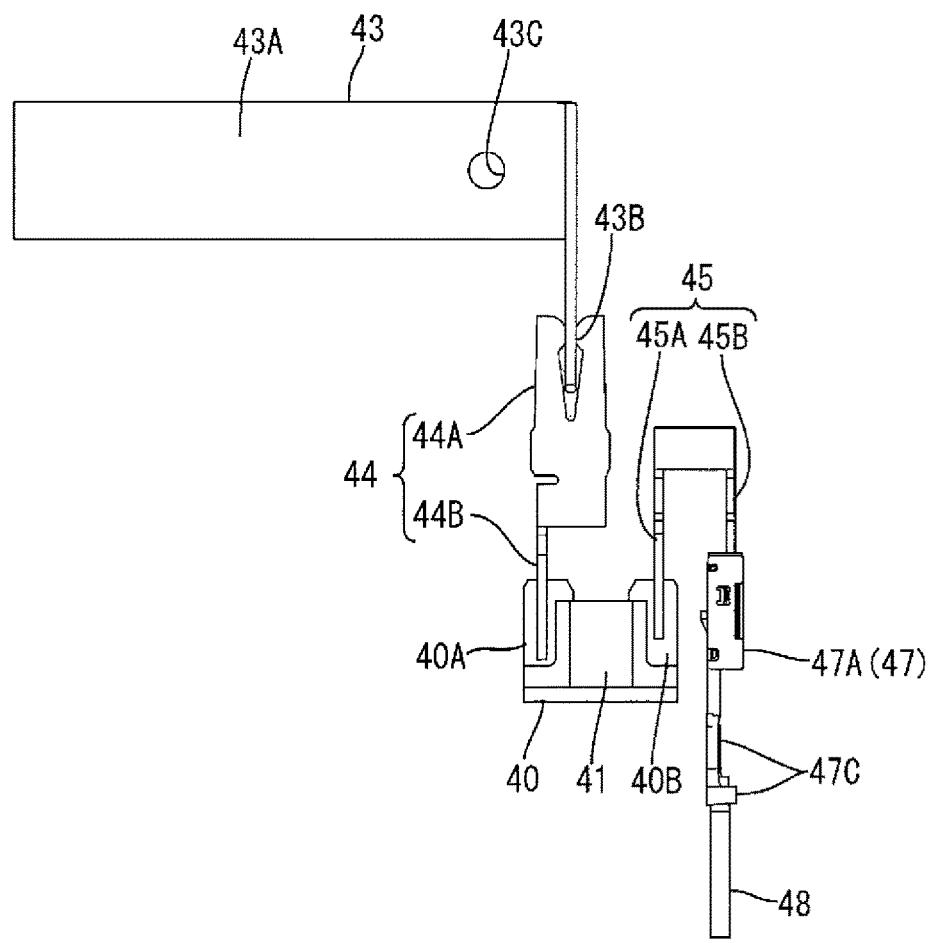
FIG. 15 is a diagram showing, from the upper side, a state in which the connector and a connection member are connected to each other.
Figure 16:
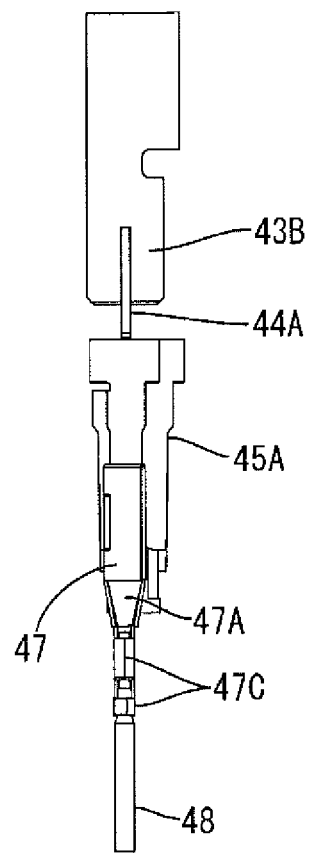
FIG. 16 is a diagram showing, from the rear side, a state in which the connector and the connection member are connected to each other.

The voltage detection bus bar 43 is electrically connected to the lead terminal 14 of the power storage element 12 (an example of a connection member). As shown in FIGS. 15 and 16, the voltage detection bus bar 43 includes a terminal connection portion 43A that is overlaid on and connected to the lead terminal 14, and a connection portion 43B that is bent perpendicularly upward with respect to the terminal connection portion 43A and is electrically connected to a fuse 40.

The attachment hole 43C into which the attachment pin 37B formed on the holding member 30 is inserted passes through the end of the terminal connection portion 43A of the voltage detection bus bar 43.

The voltage detection bus bar 43 has the connection portion 43B (an example of a connection portion that is connected to the terminal member) that is disposed in parallel with the direction in which the power storage elements 12 are stacked, and is connected to a first relay terminal 44 (an example of a terminal member).

First Relay Terminal 44

The voltage detection bus bar 43 is electrically connected to the fuse 40 via the first relay terminal 44. The first relay terminal 44 is made of a metal material such as copper, a copper alloy, aluminum, or an aluminum alloy, for example. The first relay terminal 44 includes a tuning fork-shaped terminal portion 44A formed by being branched in two at its end, and a fuse connection portion 44B that rises perpendicularly with respect to the tuning fork-shaped terminal portion 44A.

Figure 23:
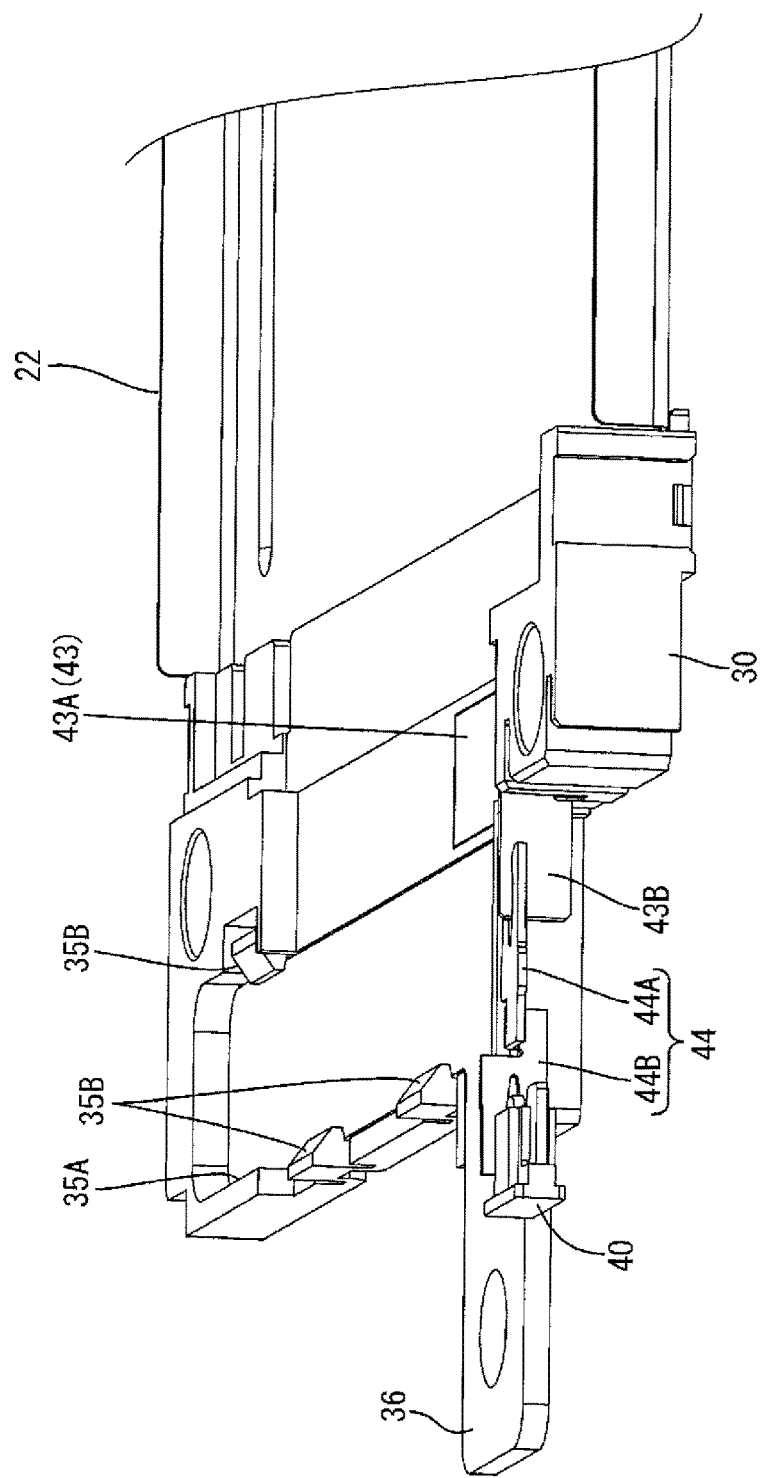
FIG. 23 is a perspective view showing a situation in which a terminal member moves in the stacking direction (upward).
Figure 24:
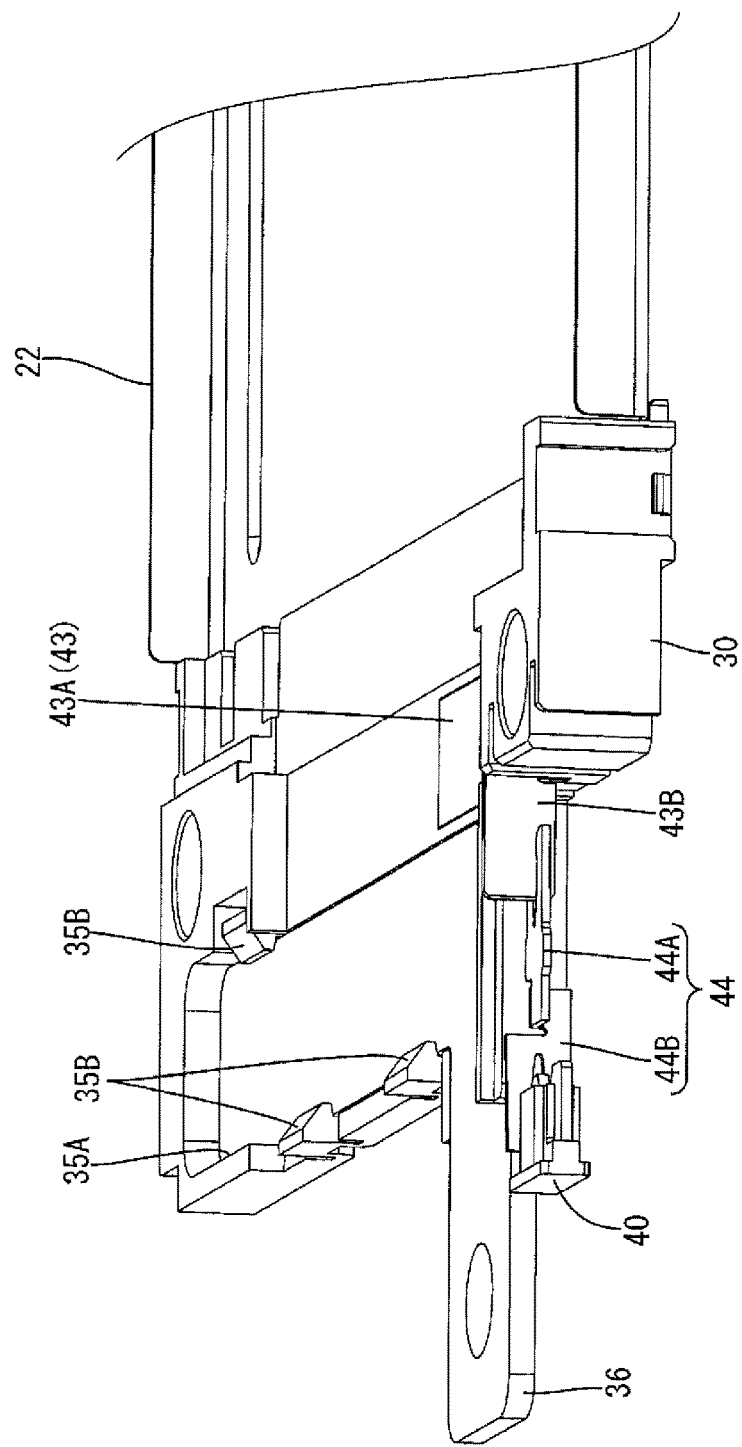
FIG. 24 is a perspective view showing a situation in which the terminal member moves in the stacking direction (downward).

The connection portion 43B of the voltage detection bus bar 43 is held by the tuning fork-shaped terminal portion 44A of the first relay terminal 44, and the tuning fork-shaped terminal portion 44A is connected to the connection portion 43B. As shown in FIGS. 23 and 24, the tuning fork-shaped terminal portion 44A of the first relay terminal 44 is connected to the connection portion 43B of the voltage detection bus bar 43 movably in the stacking direction. The tuning fork-shaped terminal portion 44A of the first relay terminal 44 is a member for electrically connecting the voltage detection bus bar 43 to the connector 50, and is an example of a terminal member.

Fuse 40

The fuse 40 has a connection portion 40A that is held by the tuning fork-shaped terminal portion 44A of the first relay terminal 44 and is electrically connected thereto, a connection portion 40B that is electrically connected to the fuse connection portion 45A of the second relay terminal 45, and an insulating portion 41 that is provided to connect the two connection portions 40A and 40B and is made of an insulating resin. The two connection portions 40A and 40B are connected to each other inside the insulating portion 41. The connection portions 40A and 40B are made of a metal material. If an overcurrent flows through the fuse 40, the overcurrent is interrupted by the fuse 40 blowing out.

Second Relay Terminal 45

The second relay terminal 45 is made of a metal material such as copper, a copper alloy, aluminum, or an aluminum alloy, for example, and includes a fuse connection portion 45A that is connected to the fuse 40, and a tab-shaped male terminal 45B that extends from the fuse connection portion 45A and is disposed inside the terminal accommodation portion 59 of the connector 50.

Connector 50

In the present embodiment, the connectors 50 are attached to the front (left side in FIG. 1) and the rear (right side in FIG. 1) of the electricity storage module 10. The connectors 50 are electrically connected to an external device (not shown) such as the voltage detection bus bar 43 (connection member), or a battery control unit.

The connector 50B attached to the front of the electricity storage module 10 has three terminal accommodation portions 59, whereas the connector 50A attached to the rear has four terminal accommodation portions 59.

The connectors 50 are constituted by a first connector 51 that is disposed on the power storage element 12 and a second connector 56 that is fitted to the first connector 51. Here, a housing for the first connector 51 is denoted as a first housing 52, and a housing for the second connector 56 is denoted as a second housing 57. FIGS. 8 to 11 show the housings 51 and 56 for the connector 50A that is disposed at the rear of the electricity storage module 10.

Figure 8:
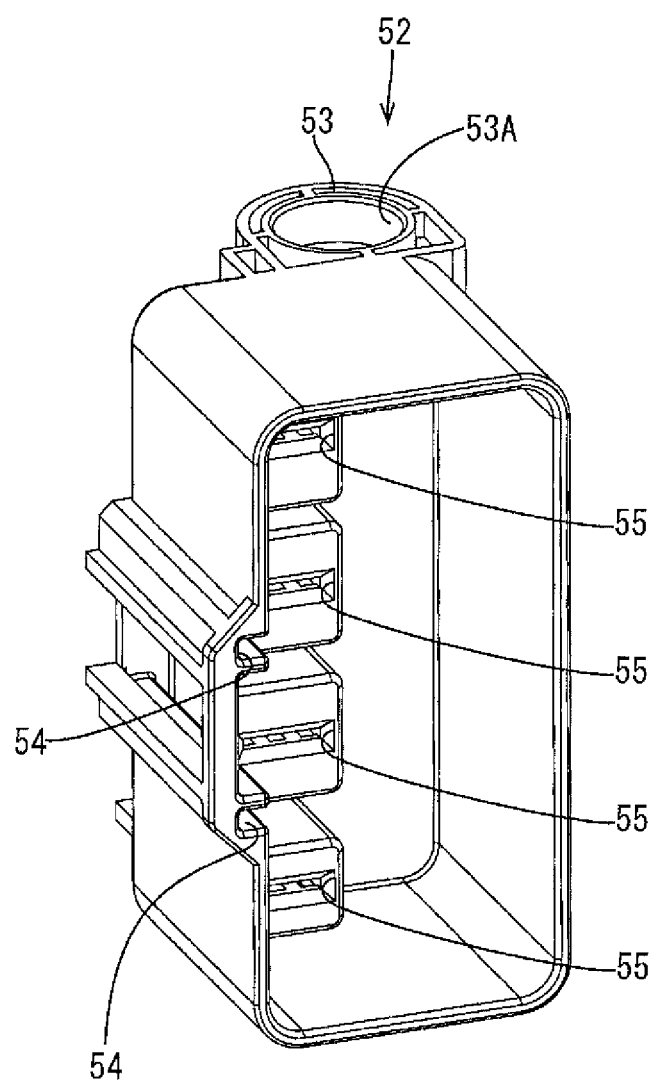
FIG. 8 is a perspective view of a first housing viewed from the right side.
Figure 9:
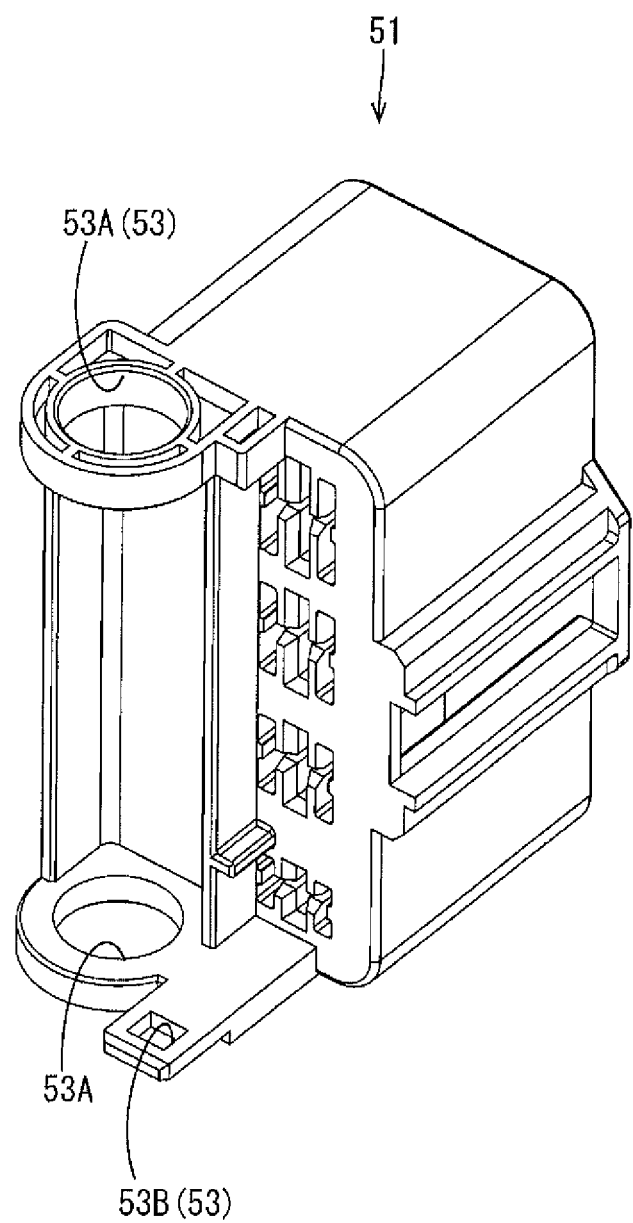
FIG. 9 is a perspective view of the first housing viewed from the side of the power storage element.
Figure 10:
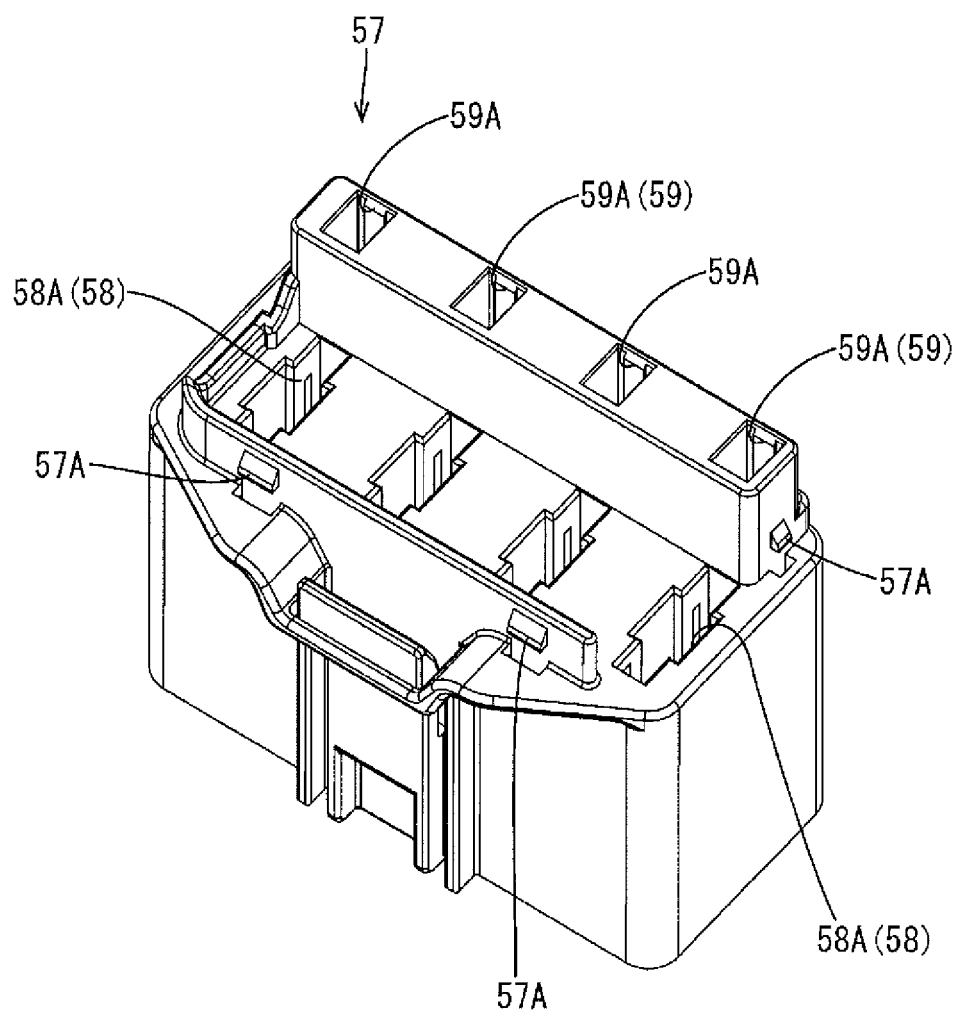
FIG. 10 is a perspective view of a second housing viewed from the right side.

As shown in FIGS. 8 and 9, the first housing 52 is provided with a fixing portion 53 that protrudes toward the power storage element 12, is overlaid on the through hole 31 of the holding member 30, and into which the fixing member is inserted. The fixing portion 53 is penetrated by a circular hole 53A that forms a single hole when overlapped with the through hole 31, and is provided with rectangular fixing holes 53B for receiving fixing protrusions (not shown) that are provided on the first holding member 30A at the lowermost stage and the fifth holding member 30E at the uppermost stage.

Also, a guide portion 54 for fitting to and guiding the second housing 57 is provided on an inner wall of the first housing 52 on the left side in FIG. 8. A bus bar arrangement portion 55 in which the connection portions 43B of the voltage detection bus bars 43 are disposed is provided inside the first housing 52.

Figure 11:
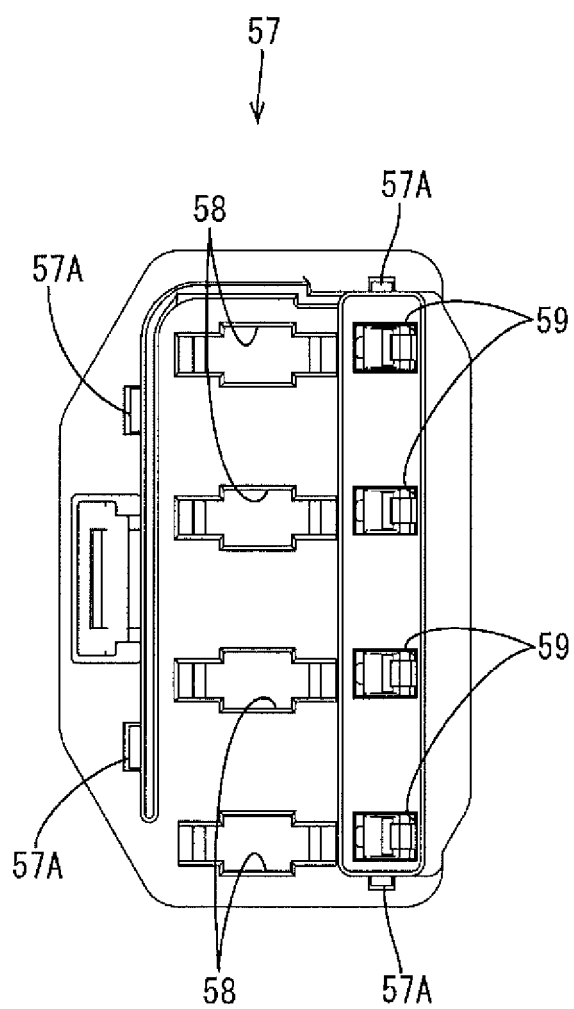
FIG. 11 is a right-side view of the second housing.
Figure 12:
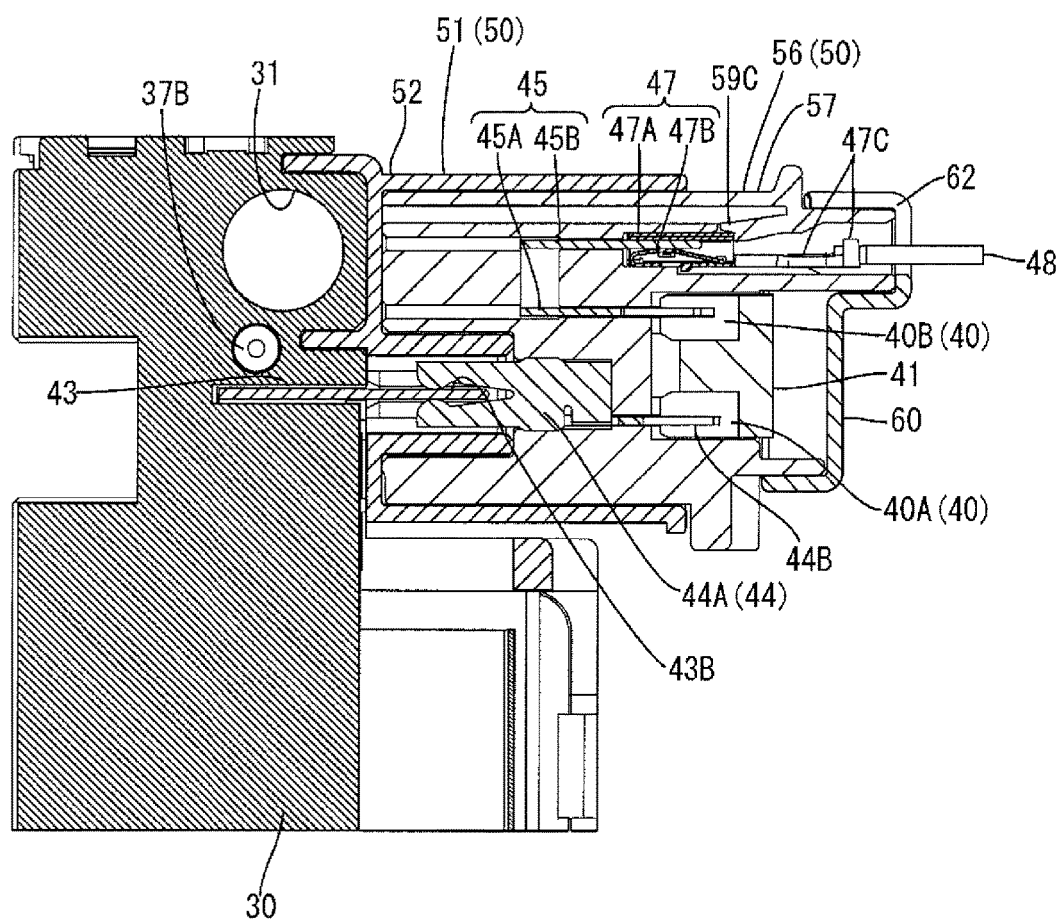
FIG. 12 is a cross-sectional view taken along line C-C in FIG. 7.
Figure 13:
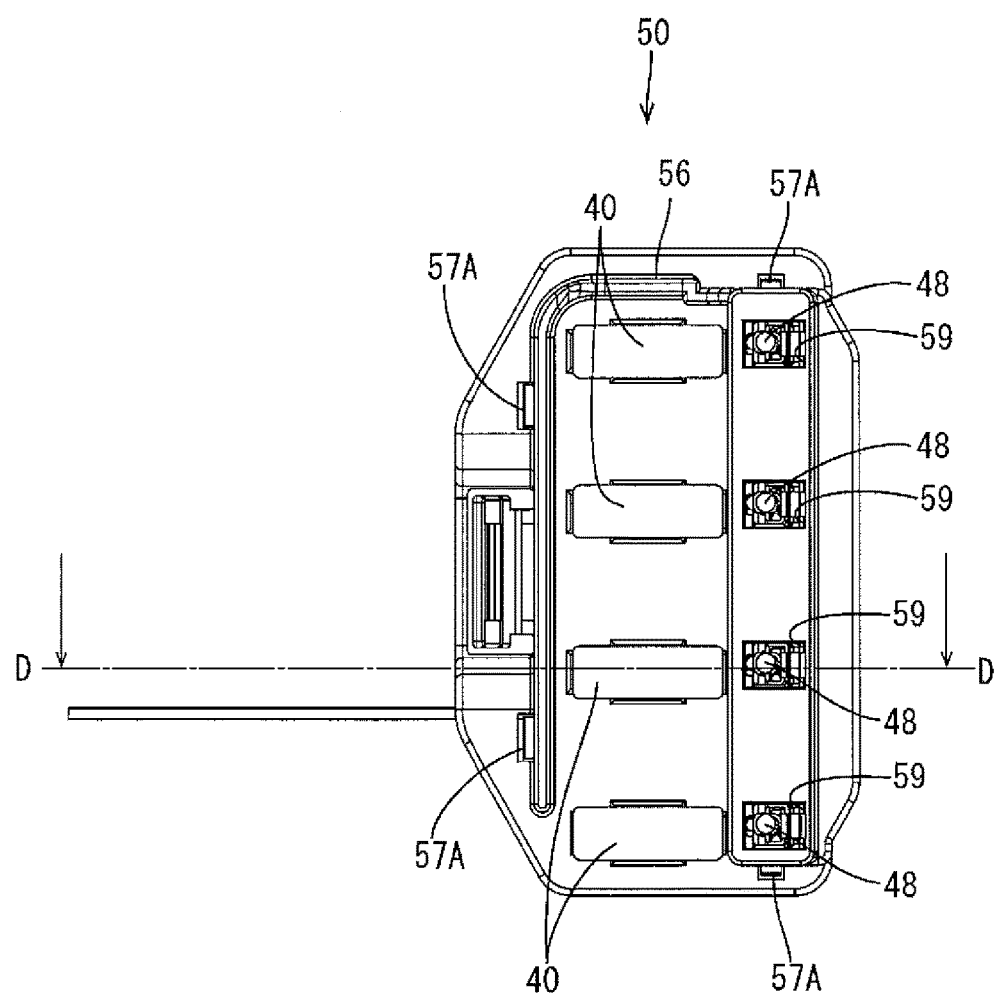
FIG. 13 is a right-side view of a connector.
Figure 14:
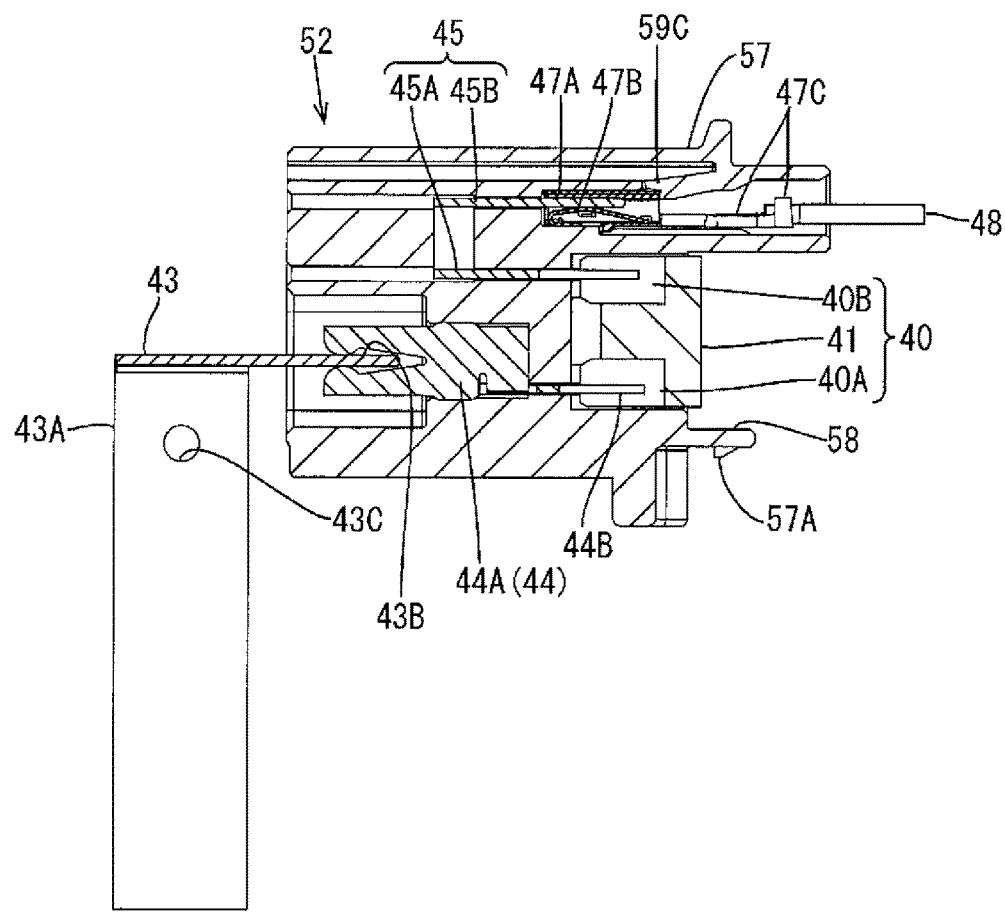
FIG. 14 is a cross-sectional view taken along line D-D in FIG. 13.

As shown in FIG. 11, the second housing 57 has terminal accommodation portions 59 on its right side, and fuse mounting portions 58 on its left side. As shown in FIG. 14, the terminal accommodation portions 59 and the fuse mounting portions 58 respectively have openings 59A and 58A. The second housing 57 includes an accommodation cover 62 for covering the openings 59A of the terminal accommodation portions 59, and a fuse cover 60 for covering the openings 58A of the fuse mounting portions 58.

Cover locking protrusions 57A for locking the fuse cover 60 protrude from a side wall (a wall on the left side in FIG. 11) of the second housing 57. Also, cover locking protrusions 57A for locking the accommodation cover 62 protrude from an upper wall and a lower wall of the second housing 57. Locking holes 61 to which the cover locking protrusions 57A are locked are formed in the fuse cover 60, and locking holes 63 to which the cover locking protrusions 57A are locked and electric wire arrangement holes 64 through which the electric wires 48 are disposed are formed in the accommodation cover 62.

The male terminal 45B of the second relay terminal 45 is disposed inside the terminal accommodation portion 59 of the second housing 57, a female terminal 47 is fitted to the male terminal 45B, and the male terminal 45B is then disposed inside the terminal accommodation portion 59. Also, as shown in FIG. 14, a lance 59C for locking the female terminal 47 that is electrically connected to the male terminal 45B is formed on the inner wall of the terminal accommodation portion 59 of the second housing 57.

The fuse connection portion 45A of the second relay terminal 45 and the fuse connection portion 44B of the first relay terminal 44 are disposed inside the fuse mounting portion 58 of the second housing 57. The first relay terminal 44, the fuse 40, and the second relay terminal 45 are connected to each other in the second housing 57.

The second housing 57 holds the first relay terminal 44 in a state in which the first relay terminal 44 is electrically connected to the voltage detection bus bar 43 while the first relay terminal 44 is allowed to move in the direction in which the power storage elements 12 are stacked (the second housing 57 is an example of a housing).

The female terminal 47 is held in a state in which the female terminal 47 is retained in the terminal accommodation portion 59 by being locked to the lance 59C formed on the inner wall of the terminal accommodation portion 59. The female terminal 47 is obtained by pressing a metal plate material to a predetermined shape. The female terminal 47 is connected to an end of the electric wire 48. The female terminal 47 includes, at a position opposite to the portion connected to the electric wire 48, a tubular terminal connection portion 47A that is connected to the male terminal 45B of the second relay terminal 45. An elastic contact piece 47B that comes into elastic contact with the male terminal 45B is disposed inside the terminal connection portion 47A. The fuse 40 and the female terminal 47 are electrically connected to each other via the second relay terminal 45 due to the male terminal 45B and the elastic contact piece 47B coming into elastic contact with each other. The electric wire 48 is connected to the female terminal 47 by crimping two sets of barrel portions 47C of the female terminal 47.

Method for Assembling Electricity Storage Module 10

Prepared are the heat transfer member 22 to which the first holding member 30A and the second holding member 30B are attached, four heat transfer members 22 to which the third holding members 30C and the fourth holding members 30D are attached, and the heat transfer member 22 to which the fifth holding member 30E and the sixth holding member 30F are attached.

The external connection bus bar 36 is attached to the bus bar holding portion 35, and the voltage detection bus bar 43 is arranged to be held by the detection terminal holding portion 37. When the terminal connection portion 43A of the voltage detection bus bar 43 is fitted to the recess 37A, the terminal connection portion 43A is retained by the retaining pieces 37C. When the terminal connection portion 43A of the voltage detection bus bar 43 is attached by the attachment pin 37B, the voltage detection bus bar 43 is fixed to the holding member 30.

Next, the power storage units 21 are produced by placing the power storage elements 12 on the heat transfer members 22, connecting the external connection bus bars 36 to the lead terminals 14, and connecting the voltage detection bus bar 43 to the lead terminal 14, with a method such as welding or the like.

Next, six power storage units 21 are stacked to produce the stacked object 20. Four second power storage units 21B are overlaid on the first power storage unit 21A, and the third power storage unit 21C is then overlaid thereon. At this time, locking portions 33 of holding members 30 that are adjacent in the stacking direction are locked to the locking reception portions 34.

Although details are not shown, in the present embodiment, a gap is formed between the locking portions 33 and the locking reception portions 34 of the holding members 30 that are adjacent in the stacking direction, and thus the holding members 30 can move in the direction in which the power storage elements 12 are stacked.

The stacked object 20 is produced by connecting the lead terminals 14 that are adjacent in the stacking direction with a method such as welding after the power storage units 21 are stacked. As a result, the through holes 31 of the holding members 30 overlap with each other to form a single hole.

The first relay terminal 44 and the second relay terminal 45 are attached to the second housing 57 at the same time as, or before or after a step of producing the stacked object 20. Specifically, the first relay terminal 44 is accommodated in the fuse mounting portion 58 of the second housing 57. The fuse connection portion 45A of the second relay terminal 45 is disposed inside the fuse mounting portion 58 of the second housing 57, and the male terminal 45B of the second relay terminal 45 is disposed inside the terminal accommodation portion 59 of the second housing 57.

Next, when the female terminal 47 is inserted through the opening 59A of the terminal accommodation portion 59, the female terminal 47 is locked to and is retained by the lance 59C, and the elastic contact piece 47B of the terminal connection portion 47A of the female terminal 47 and the male terminal 45B come into elastic contact with each other (see FIG. 14).

Next, when the fuse 40 is inserted into the fuse mounting portion 58, the connection portion 40A of the fuse 40 is held by the tuning fork-shaped terminal portion 44A of the first relay terminal 44, and the connection portion 40B is connected to the fuse connection portion 45A of the second relay terminal 45. Next, when the opening 59A of the terminal accommodation portion 59 is covered with the accommodation cover 62 so that the accommodation cover 62 is locked to the second housing 57, and the opening 58A of the fuse mounting portion 58 is covered with the fuse cover 60 so that the fuse cover 60 is locked to the second housing 57, the second connector 56 is obtained.

Next, the first housing 52 of the first connector 51 is attached to the stacked object 20. When the fixing portion 53 of the first housing 52 is attached to the holding member 30, the circular hole 53A of the fixing portion 53 overlaps with the through hole 31 of the holding member 30 to form a single hole, and a fixing protrusion of the holding member 30 that is disposed at the uppermost stage and a fixing protrusion of the holding member 30 that is disposed at the lowermost stage are fitted to the fixing hole 53B of the fixing portion 53. Also, the connection portion 43B of the voltage detection bus bar 43 is disposed on the bus bar arrangement portion 55 of the first housing 52.

Next, when the second housing 57 of the second connector 56 is fitted to the first housing 52 of the first connector 51, the tuning fork-shaped terminal portion 44A of the first relay terminal 44 that is disposed inside the second housing 57 is connected to the connection portion 43B of the voltage detection bus bar 43 that is disposed on the bus bar arrangement portion 55 of the first housing 52, movably in the stacking direction.

FIGS. 23 and 24 show a situation in which the tuning fork-shaped terminal portion 44A of the first relay terminal 44 is connected movably in the stacking direction (the vertical direction). Note that the first housing 52, the second housing 57, the external connection bus bar, other power storage units 21, and the like are omitted in FIGS. 23 and 24. For example, in one power storage unit 21, if the power storage element 12 is thick, the tuning fork-shaped terminal portion 44A of the first relay terminal 44 is disposed near the top of the connection portion 43B of the voltage detection bus bar 43, whereas if the power storage element 12 is thin, the tuning fork-shaped terminal portion 44A is disposed near the bottom of the position of the connection portion 43B. The tuning fork-shaped terminal portion 44A of the first relay terminal 44 that is shown in FIG. 23 is disposed at a higher position than the position of the tuning fork-shaped terminal portion 44A of the first relay terminal 44 that is shown in FIG. 24. In this manner, regarding variations in the thickness of the power storage element 12, tolerances in the stacking direction are accommodated by movement of the tuning fork-shaped terminal portion 44A of the first relay terminal 44 on the connection portion 43B of the voltage detection bus bar 43 in the direction in which the power storage elements are stacked, and adjusting the connection position.

Figure 25:
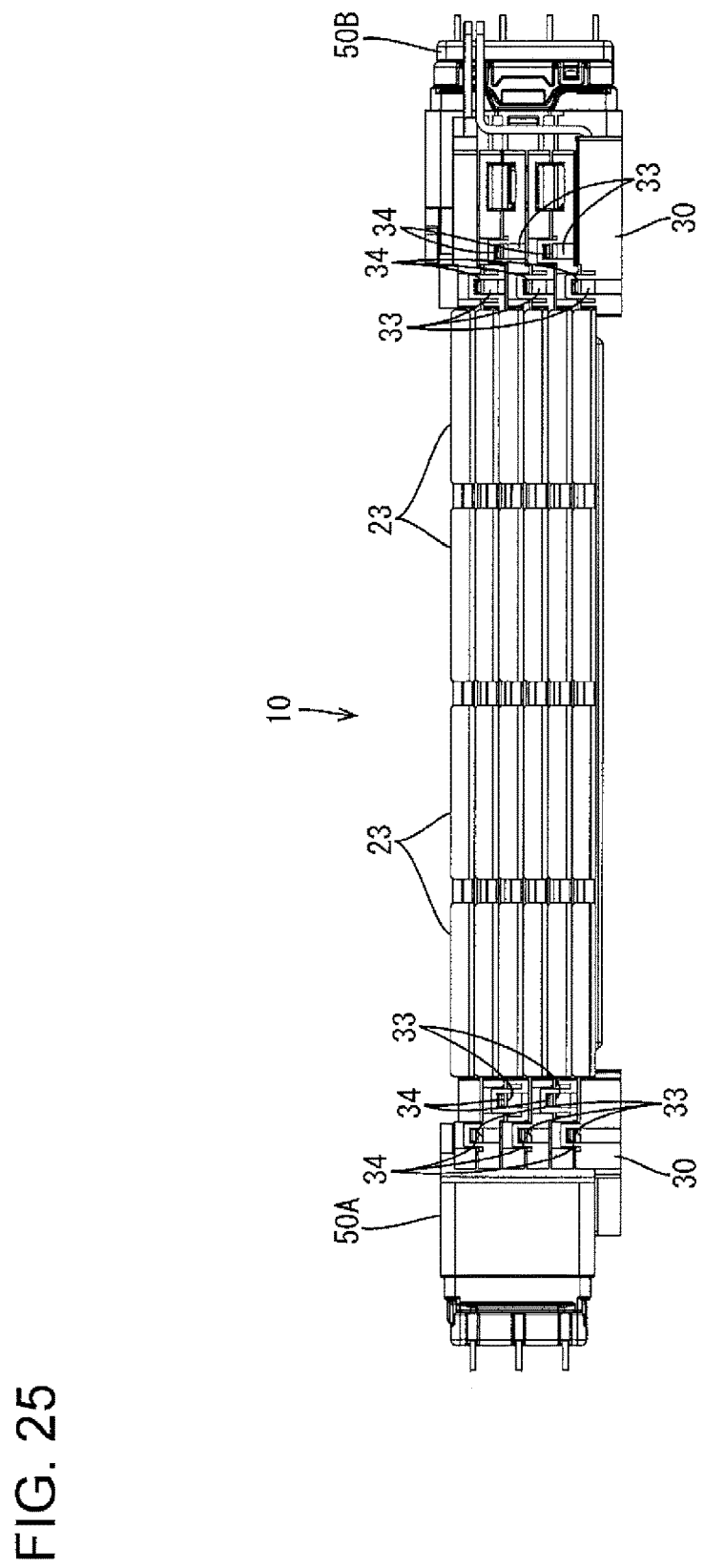
FIG. 25 is a front view of an electricity storage module when a stacked object has the maximum thickness.
Figure 26:
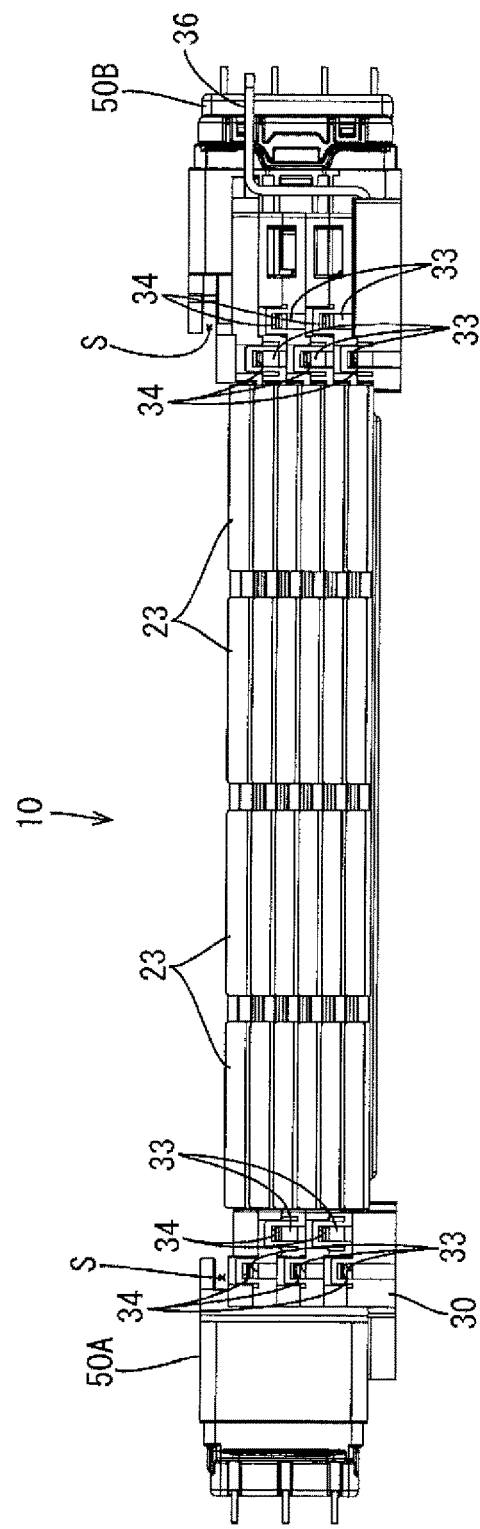
FIG. 26 is a front view of the electricity storage module when the stacked object has the minimum thickness.
Figure 27:
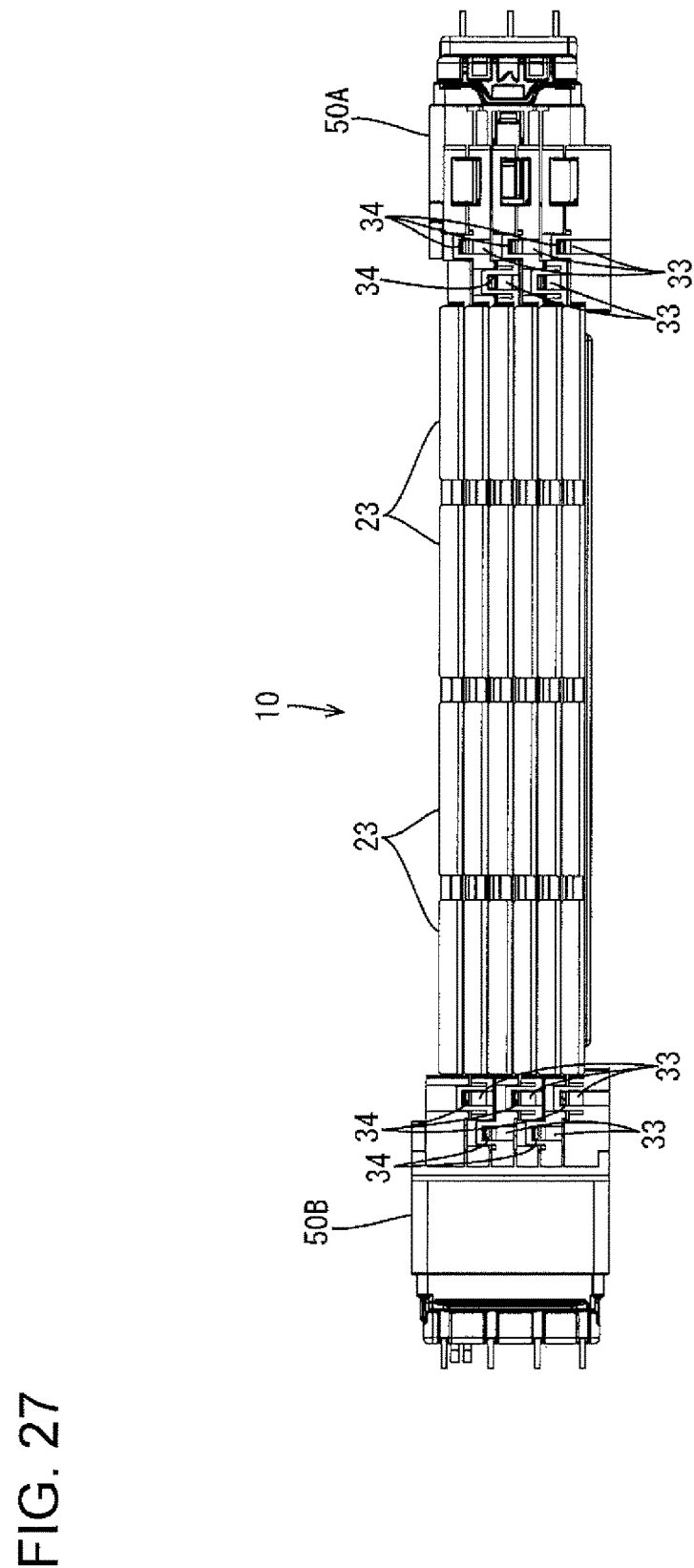
FIG. 27 is a rear view of the electricity storage module when the stacked object has the maximum thickness.
Figure 28:
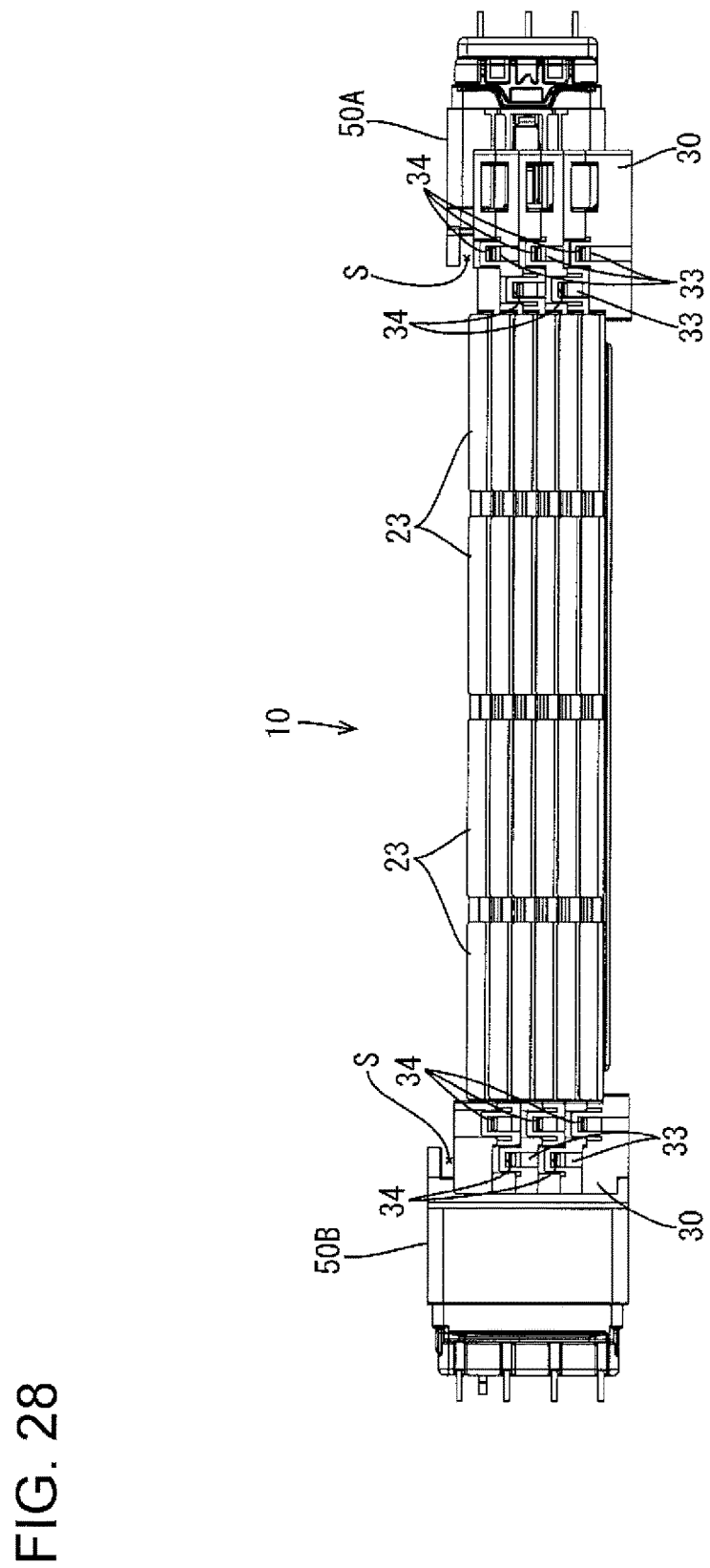
FIG. 28 is a rear view of the electricity storage module when the stacked object has the minimum thickness.

Tolerances in the direction in which the power storage elements 12 are stacked are accommodated by the movement of the tuning fork-shaped terminal portion 44A of the first relay terminal 44 in the stacking direction with respect to the connection portion 43B of the voltage detection bus bar 43 that is disposed on the bus bar arrangement portion 55 of the first housing 52. Here, FIGS. 25 and 27 show the case where the total thickness of the power storage unit 21 (thickness of the stacked object 20) is maximal, and FIGS. 26 and 28 show the case where the total thickness of the power storage unit 21 (thickness of the stacked object 20) is minimal. As shown in FIGS. 25 and 27, if the stacked object 20 has the maximum thickness, there is no gap between the stacked object 20 and the upper end of the connector 50, but as shown in FIGS. 26 and 28, if the thickness of the stacked object 20 is small, there is a gap S between the stacked object 20 and the upper end of the connector 50.

Functional Effects and Effects of Present Embodiment

Subsequently, the functional effects and effects of the present embodiment will be described.

According to the present embodiment, the voltage detection bus bar 43 is disposed in parallel with the direction in which the power storage elements 12 are stacked, has a connection portion 43B that is connected to the first relay terminal 44, and the first relay terminal 44 is connected to the connection portion 43B in a state in which the first relay terminal 44 can move in the direction in which the power storage elements 12 are stacked, and thus, tolerances in the direction in which the power storage elements 12 are stacked can be accommodated by movement of the first relay terminal 44 in the direction in which the power storage elements 12 are stacked.

As a result, according to the present embodiment, simply with a configuration in which the connection portion 43B of the voltage detection bus bar 43 is disposed in parallel with the direction in which the power storage elements 12 are stacked and a configuration in which the first relay terminal 44 is connected to the connection portion 43B movably in the stacking direction, tolerances in the direction in which the power storage elements 12 are stacked can be accommodated. Therefore, tolerances in the direction in which the power storage elements 12 are stacked can be accommodated even with a simple configuration.

Incidentally, if the first relay terminal 44 that is allowed to move in the direction in which the power storage elements 12 are stacked passes the position at which the first relay terminal 44 is connected to the voltage detection bus bar 43, there is a concern that the state of electrical connection with the voltage detection bus bar 43 will deteriorate.

However, in the present embodiment, since the connectors 50 include the second housing 57 for holding the tuning fork-shaped terminal portion 44A of the first relay terminal 44 in a state in which the tuning fork-shaped terminal portion 44A is electrically connected to the voltage detection bus bar 43 while allowing the movement of the tuning fork-shaped terminal portion 44A in the direction in which the power storage elements 12 are stacked, the first relay terminal 44 is held in the state in which the first relay terminal 44 is electrically connected to the voltage detection bus bar 43 while the first relay terminal 44 is allowed to move in the direction in which the power storage elements 12 are stacked, and therefore, it is possible to ensure the state in which the first relay terminal 44 is electrically connected to the voltage detection bus bar 43.

Also, according to the present embodiment, since the connector 50 is provided with the fuse mounting portion 58 for mounting the fuse 40 that is to be electrically connected to the lead terminal 14, the fuse 40 can be disposed near the power storage element 12, and therefore, overcurrent is unlikely to affect the other power storage elements 12.

Furthermore, according to the present embodiment, since the holding members 30 that are adjacent in the direction in which the power storage elements 12 are stacked are locked movably in the direction in which the power storage elements 12 are stacked, tolerances in the direction in which the power storage elements 12 are stacked can be accommodated.

Other Embodiments

The present invention is not limited to the embodiment described above using the foregoing description and drawings, and embodiments such as the following are also encompassed in the technical scope of the present invention.

(1) Although in the above-described embodiment, a configuration has been shown in which the connector 50 includes the housing 57 for holding the first relay terminal 44 in a state in which the first relay terminal 44 is electrically connected to the voltage detection bus bar 43 while the first relay terminal 44 is allowed to move in the direction in which the power storage elements 12 are stacked, a configuration in which a housing is not included may be possible.

(2) Although the connector 50 provided with the fuse mounting portion 58 for mounting the fuse 40 that is to be electrically connected to the lead terminal 14 has been shown in the above-described embodiment, a connector that is not provided with the fuse mounting portion may be used.

REFERENCE SIGNS LIST

10 Electricity storage module
11 Power storage element group
12 Power storage element
14 Lead terminal
20 Stacked object
21 Power storage unit
21A First power storage unit
21B Second power storage unit
21C Third power storage unit
30 Holding member
30A First holding member
30B Second holding member
30C Third holding member
30D Fourth holding member
30E Fifth holding member
30F Sixth holding member
33 Locking portion
34 Locking reception portion
37 Detection terminal holding portion
37A Recess
37B Attachment pin
37C Retaining piece
40 Fuse
43 Voltage detection bus bar (connection member)
43A Terminal connection portion
43B Connection portion
44 First relay terminal (terminal member)
44A Tuning fork-shaped terminal portion (terminal member)
44B Fuse connection portion
45 Second relay terminal
47 Female terminal
48 Electric wire
50 Connector
51 First connector
52 First housing
56 Second connector
57 Second housing
58 Fuse mounting portion
59 Terminal accommodation portion

The invention claimed is:

1. An electricity storage module comprising:
a power storage element group obtained by stacking a plurality of power storage elements each having a lead terminal;
a connection member that is electrically connected to the lead terminal;
a connector configured to electrically connect the connection member to an external device; and
a terminal member configured to electrically connect the connection member to the connector,
the connection member having a connection portion that is disposed in parallel with a direction in which the power storage elements are stacked, and that is connected to the terminal member, and the terminal member being connected to the connection portion in a state in which the terminal member is movable in the direction in which the power storage elements are stacked.

2. The electricity storage module according to claim 1, wherein
the connector includes a housing configured to hold the terminal member in a state in which the terminal member is electrically connected to the connection member while the terminal member is allowed to move in the direction in which the power storage elements are stacked.

3. The electricity storage module according to claim 2, wherein
the connector is provided with a fuse mounting portion configured to mount a fuse that is to be electrically connected to the lead terminal.

4. The electricity storage module according to claim 1, wherein
the connector is provided with a fuse mounting portion configured to mount a fuse that is to be electrically connected to the lead terminal.

\* \* \* \* \*